United States Patent
Fyock et al.

(10) Patent No.: US 8,572,659 B2
(45) Date of Patent: Oct. 29, 2013

(54) EXTENDED DIGITAL VIDEO RECORDER

(75) Inventors: Christina L Fyock, Sudbury, MA (US);
Michael P Ruffini, Methuen, MA (US);
Paulo Goncalves de Barros, Worcester, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 696 days.

(21) Appl. No.: 12/142,516

(22) Filed: Jun. 19, 2008

(65) Prior Publication Data

US 2009/0317065 A1    Dec. 24, 2009

(51) Int. Cl.
*H04N 5/445* (2011.01)

(52) U.S. Cl.
USPC ............... 725/58; 725/86; 725/87; 725/91; 725/92; 725/93; 386/291

(58) Field of Classification Search
USPC .................... 725/58, 86, 87, 91–93
See application file for complete search history.

(56) References Cited

U.S. PATENT DOCUMENTS

| | | | |
|---|---|---|---|
| 7,143,430 B1 * | 11/2006 | Fingerman et al. | 725/87 |
| 7,650,621 B2 * | 1/2010 | Thomas et al. | 725/87 |
| 2005/0138659 A1 * | 6/2005 | Boccon-Gibod et al. | 725/58 |
| 2007/0104456 A1 * | 5/2007 | Craner | 386/83 |
| 2007/0157266 A1 * | 7/2007 | Ellis et al. | 725/89 |
| 2008/0022304 A1 * | 1/2008 | Prus et al. | 725/39 |
| 2009/0142036 A1 * | 6/2009 | Branam et al. | 386/83 |

* cited by examiner

*Primary Examiner* — Jeremy Duffield

(57) ABSTRACT

A device receives, from one of a set-top box/digital video recorder (STB/DVR) or a user device, a request to allocate an amount of storage, and allocates the amount of storage based on the allocation request, logically extending the user's available storage. The device also receives, from the one of a set-top box/digital video recorder (STB/DVR) or a user device, a request to record content, and records the content to one or more portions of the allocated storage based on the record request.

25 Claims, 18 Drawing Sheets

FIG. 5

| Program | Type | Size | Time | Source |
|---|---|---|---|---|
| Hollywood Squares | TV Program | 3MB | 30 minutes | STB/DVR |
| Joe's 1st Birthday | Home Movie | 1MB | 15 minutes | Mobile Phone |
| Movie Trailer | Web Movie | 0.1MB | 2 minutes | Computer |

FIG. 6

| Program | Type | Size | Time | Source |
|---|---|---|---|---|
| Wheel of Fortune | TV Program | 2.5MB | 25 minutes | STB/DVR |
| 4th of July | Home Movie | 0.5MB | 5 minutes | Mobile Phone |
| News Clip | Web News | 0.1MB | 2 minutes | Computer |

US 8,572,659 B2

EXTENDED DIGITAL VIDEO RECORDER

BACKGROUND

With current set-top box/digital video recorders (STB/DVRs), a consumer is generally limited to a number of tuners available on their STB/DVR, and is limited to an amount of local disk storage available to the STB/DVR. Because of this, consumers are constantly having to manage their local STB/DVR storage (e.g., by deleting programs so that new content may be recorded by the STB/DVR). There are limited options (e.g., due to copyright issues) for consumers to transfer such content to another media device within the home, which makes archiving the content problematic.

STB/DVRs also typically limit a number of programs that can be recorded at a given time. This may cause consumer frustration because consumers may need to decide which programs they want to record (e.g., tuner conflict is currently a manual process). Furthermore, adding tuners and disk space to STB/DVRs is a non-trivial task and is generally very expensive.

BRIEF DESCRIPTION OF THE DRAWINGS

FIG. 5 depicts a diagram of a portion of an exemplary database capable of being provided in and/or managed by the STB/DVR of the network illustrated in FIG. 1;

FIG. 6 illustrates a diagram of a portion of an exemplary database capable of being provided in and/or managed by the content server of the network illustrated in FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may extend a STB/DVR into a network so that a user may copy, transfer, and/or archive content to a network storage device, and may increase a number of programs that may be recorded at a specific time. The systems and/or methods may enable a user to purchase various amounts of storage space in the network for recording or uploading content, and may provide the recorded/saved content to various devices (e.g., a STB, a personal computer, a mobile telephone, etc.) for viewing. In one implementation, for example, the systems and/or methods may receive a request to allocate an amount of storage, and may allocate the amount of storage based on the request. The systems and/or methods may receive a request to record and/or upload content, and may record and/or upload the content to one or more portions of the allocated storage based on the record/upload request. The systems and/or methods may receive a request to view content from one or more STBs and/or one or more user devices (e.g., personal computers, mobile telephones, etc.), may retrieve the requested content from one or more portions of the allocated storage, and may provide the retrieved content to the STB(s) and/or user device(s).

"Content," as the term is used herein, is to be broadly construed to include, for example, music files, short form video segments (e.g., music videos, television (TV) programs, video clips, etc.), long form video segments (e.g., movies), games, publications, user-generated content (e.g., home videos, personal videos, YouTube video service-based videos, etc.), etc.

Figure 1:
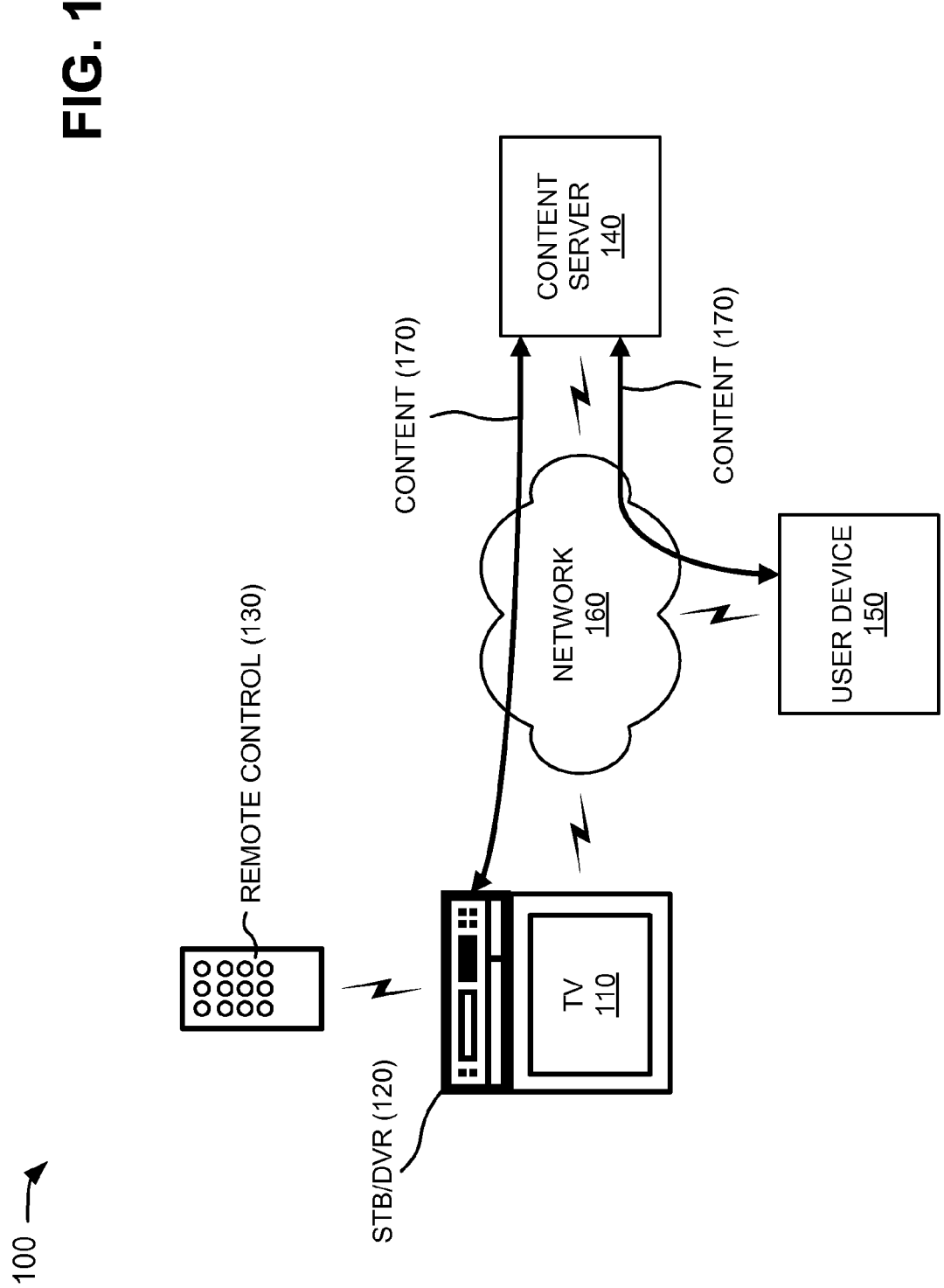
FIG. 1 depicts a diagram of an exemplary network in which systems and methods described herein may be implemented.

FIG. 1 is a diagram of an exemplary network 100 in which systems and methods described herein may be implemented. As illustrated, network 100 may include a television (TV) 110, a set-top box/digital video recorder (STB/DVR) 120, a remote control 130, a content server 140, and a user device 150 interconnected by a network 160. Components of network 100 may interconnect via wired and/or wireless connections. A single television, STB/DVR, remote control, content server, user device, and network have been illustrated in FIG. 1 for simplicity. In practice, there may be more televisions, STB/DVRs, remote controls, content servers, user devices, and/or networks. Also, in some instances, one or more of the components of network 100 may perform one or more functions described as being performed by another one or more of the components of network 100.

Television 110 may include any conventional television monitor that is capable of displaying television programming, content provided by STB/DVR 120, and/or content provided by other devices (e.g., a digital video disk (DVD) player, a video camera, etc., not shown) connected to television 110.

STB/DVR 120 may include a conventional device that receives television programming (e.g., from content server 140), and provides the television programming to television 110 or another device. STB/DVR 120 may allow a user to alter the programming provided to television 110 based on a signal (e.g., a channel up or channel down signal) from remote control 130. STB/DVR 120 may record video in a digital format to a disk drive or other memory medium within STB/DVR 120. In one exemplary implementation, STB/DVR 120 may be incorporated directly within television 110.

Remote control 130 may include a device that allows a user to control programming and/or content displayed on television 110 via interaction with STB/DVR 120.

Content server 140 may include one or more server entities, or other types of computation or communication devices, that gather, process, search, and/or provide information in a manner described herein. In one implementation, content server 140 may include a server (e.g., a computer system or an application), a cable head-end, or a broadcaster capable of storing content 170 (e.g., TV programming, movies, on-demand services, live television, user-generated content, etc.) requested by STB/DVR 120 and/or provided by STB/DVR 120 and/or user device 150. Content server 140 may provide content 170 to STB/DVR 120 (e.g., for viewing on television 110) and/or user device 150 (e.g., for viewing). Content server may receive content 170, may filter content 170 (e.g., may review and approve content 170 from a legal perspective (e.g., a check against potential copyright issues)), and may transform the filtered content into a TV compatible format (e.g., a TV compatible video CODEC (MPEG 2 or MPEG 4)). Furthermore, the format of content 170 may depend upon the source of content 170 (e.g., if a user is recording a movie from a user device (e.g., a mobile phone) to content server 140, the format of the movie may be different than the format of same movie recorded by STB/DVR 120 from the television). In one example, content server 140 may store multiple copies (if applicable) of content 170 (e.g., if several users record and archive the same program, content server 140 may maintain a separate copy of the program for each user). Such an arrangement may avoid potential copyright issues associated with storing content 170.

User device 150 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a lap top, a personal computer, or other types of computation or communication devices, threads or processes running on these devices, and/or objects executable by these devices. In one implementation, user device 150 may include any device (e.g., an Internet Protocol (IP)-based device) that is capable of accessing content server 140 via network 160.

Network 160 may include a local area network (LAN), a wide area network (WAN), a metropolitan area network (MAN), a telephone network, such as the Public Switched Telephone Network (PSTN), an intranet, the Internet, an optical fiber (or fiber optic)-based network, or a combination of networks.

Figure 2:
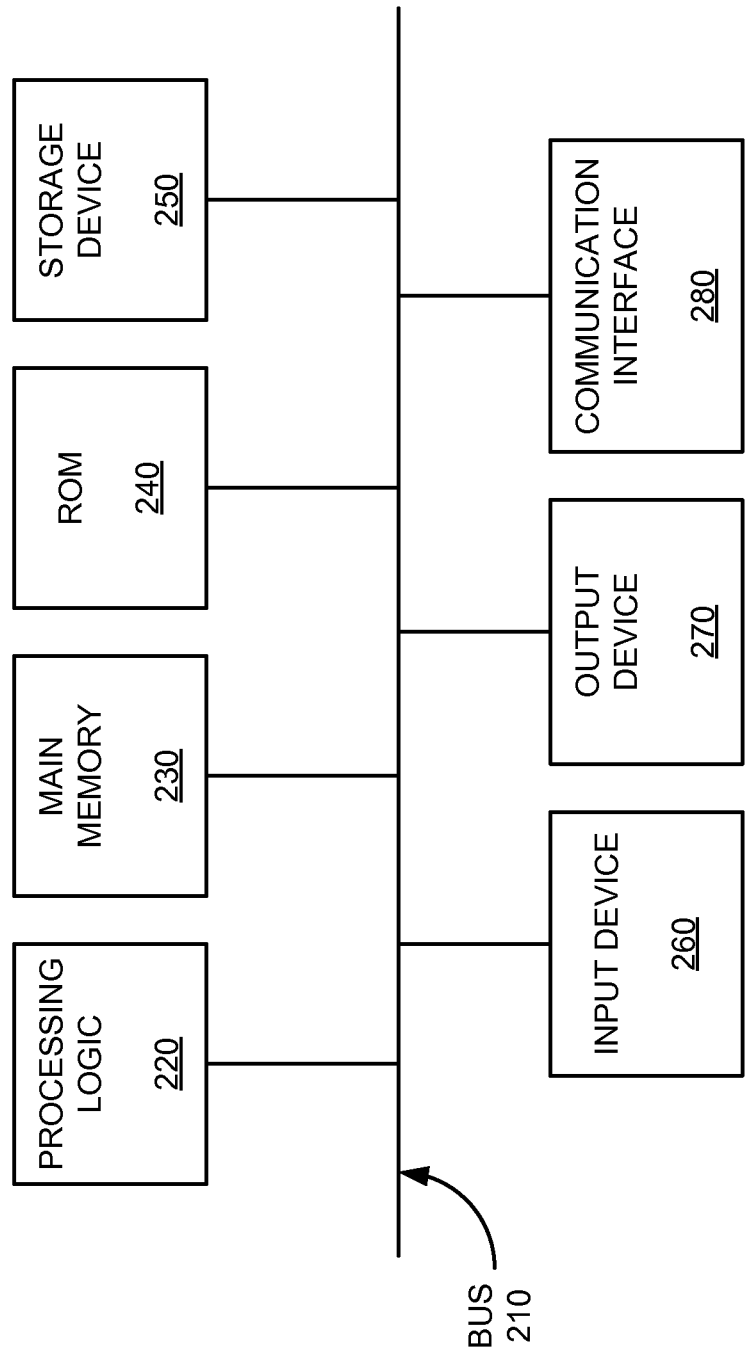
FIG. 2 illustrates exemplary components of a STB/DVR, a content server, and/or a user device of the network depicted in FIG. 1.

FIG. 2 is an exemplary diagram of a device 200 that may correspond to any of STB/DVR 120, content server 140, and/or user device 150. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, remote control 130, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 160.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

Figure 3:
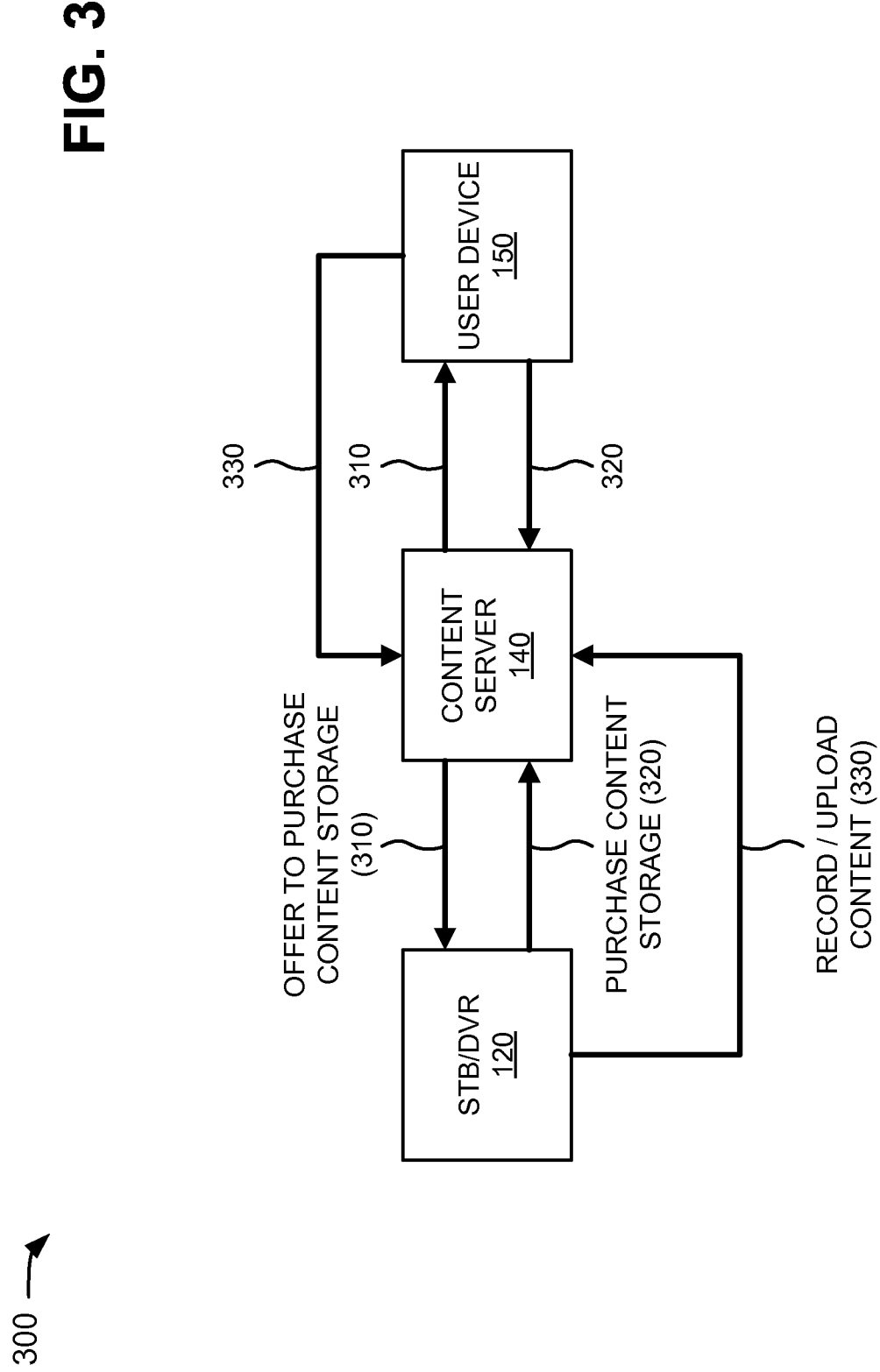
FIG. 3 depicts a diagram of an exemplary portion of the network illustrated in FIG. 1.

FIG. 3 depicts a diagram of an exemplary portion 300 of network 100. As illustrated, exemplary network portion 300 may include STB/DVR 120, content server 140, and user device 150. STB/DVR 120, content server 140, and user device 150 may include the features described above in connection with, for example, FIG. 1.

As further shown in FIG. 3, content server 140 may provide an offer to purchase content storage, as indicated by reference number 310, to STB/DVR 120 and/or user device 150. STB/DVR 120 and/or user device 150 may receive offer 310, and may purchase content storage, as indicated by reference number 320, from content server 140. In one implementation, STB/DVR 120 and/or user device 150 may provide a request to allocate an amount of storage (e.g., associated with content server 140) when STB/DVR 120 and/or user device 150 purchases the content storage. Content server 140 may receive the request, and may allocate the amount of storage based on the request.

STB/DVR 120 and/or user device 150 may request that content (e.g., TV programming) be recorded by content server 140 and/or may upload content (e.g., a home movie, a web movie, previously recorded TV programming, etc.) to content server 140, as indicated by reference number 330. In one implementation, STB/DVR 120 and user device 150 may provide a request to record content (e.g., from a broadcast) and/or upload content to content server 140, and content server 140 may receive the record/upload request. Content server 140 may record the requested content (e.g., content server 140 may receive the TV broadcast (e.g., streaming from a TV broadcast source, not shown)), and may provide the recorded content to one or more portions of the storage allocated to STB/DVR 120 and/or user device 150. In one example, STB/DVR 120 and/or user device 150 may request that content (e.g., a TV broadcast provided by a TV broadcast source) be recorded by STB/DVR 120 and/or content server 140. STB/DVR 120 and/or content server 120 may receive the TV broadcast stream from the TV broadcast source, and may record the TV broadcast. Alternatively and/or additionally, content server 140 may receive the uploaded content, and may provide the uploaded content to one or more portions of the storage allocated to STB/DVR 120 and/or user device 150.

Although FIG. 3 show exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300.

Figure 4:
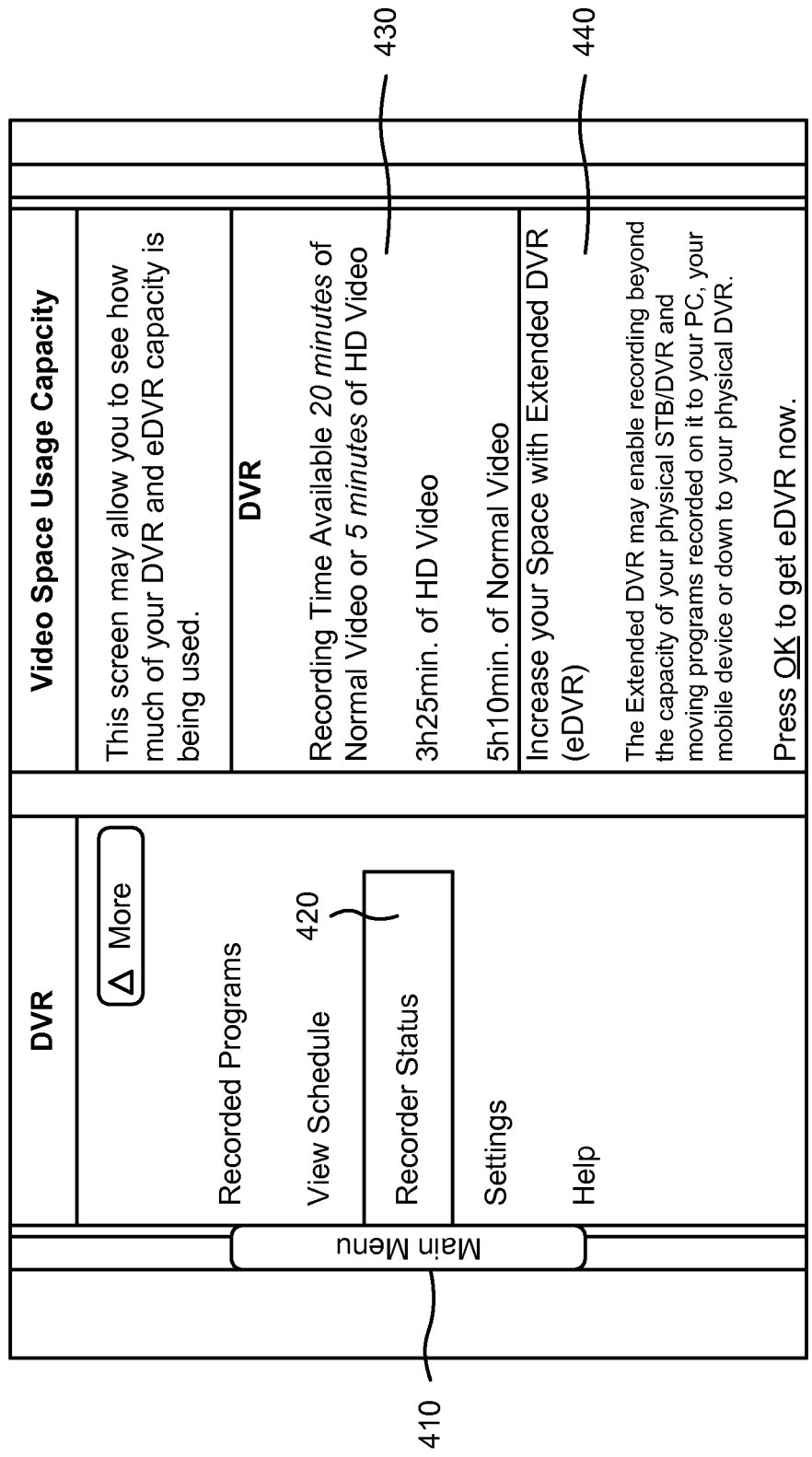
FIG. 4 illustrates a diagram of an exemplary recorder status user interface capable of being generated by the STB/DVR and/or the content server of the network depicted in FIG. 1.

FIG. 4 illustrates a diagram of an exemplary recorder status user interface 400 capable of being generated by STB/DVR 120 and/or content server 140. The user interface depicted in FIG. 4, and each of the user interfaces depicted in FIGS. 7, 9, 10, 12, and 13 and described below (collectively referred to as "the user interfaces"), may include a graphical user interface (GUI) or a non-graphical user interface, such as a text-based interface. The user interfaces may provide information to users via a customized interface (e.g., a proprietary interface) and/or other types of interfaces (e.g., a browser-based interface). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., output device 270).

As illustrated in FIG. 4, recorder status user interface 400 may include a main menu 410, a recorder status entry 420, a DVR capacity section 430, and/or an extended DVR section 440. Recorder status user interface 400 may be displayed to a user of STB/DVR 120 and/or user device 150. Information associated with recorder status user interface 400 may be selected by a user of STB/DVR 120 and/or user device 150 (e.g., via input device 260 and/or output device 270 (e.g., a touch-screen display)).

Main menu 410 may include a variety of selectable information associated with STB/DVR 120. For example, main menu 410 may provide a recorded programs entry, a view schedule entry, recorder status entry 420, a settings entry, and a help entry. The recorded programs entry, if selected, may provide information associated with programs recorded by and stored on STB/DVR 120. The view schedule entry, if selected, may provide information associated with a schedule of television programs. Recorder status entry 420, when selected (e.g., as depicted in FIG. 4), may provide information associated with a capacity of STB/DVR 120, such as the information depicted by recorder status user interface 400. The settings entry, if selected, may provide settings information associated with STB/DVR 120. The help entry, if selected, may provide help information associated with STB/DVR 120.

DVR capacity section 430 may provide a variety of information associated with the capacity of STB/DVR 120. For example, DVR capacity section 430 may provide an amount of available recording time (e.g., "Recording Time Available 20 minutes of Normal Video or 5 minutes of HD Video") associated with STB/DVR 120. DVR capacity section 430 may provide an amount of high definition (HD) video (e.g., "3 h 25 min. of HD Video") stored by STB/DVR 120, and an amount of normal video (e.g., "5 h 10 min. of Normal Video") stored by STB/DVR 120.

Extended DVR section 440 may provide a variety of information associated with an extended DVR (eDVR) service (e.g., a service that allocates storage on content server 140 for content other than or in addition to the content stored by STB/DVR 120). For example, extended DVR section 440 may provide information explaining the extended DVR service (e.g., "The Extended DVR may enable recording beyond the capacity of your physical STB/DVR and moving programs recorded on it to your PC, your mobile device or down to your physical DVR."). Extended DVR section 440 may also provide an option of subscribing to the extended DVR service (e.g., "Press OK to get eDVR now.").

Although recorder status user interface 400 depicts a variety of information, in other implementations, recorder status user interface 400 may depict fewer, different, or additional information than depicted in FIG. 4.

FIG. 5 depicts a diagram of a portion 500 of an exemplary database capable of being provided in and/or managed by STB/DVR 120. In one implementation, the information provided in database portion 500 may be provided by STB/DVR 120 when a user records content with STB/DVR 120. As illustrated, database portion 500 may include a variety of information associated with content. For example, database portion 500 may include a program field 510, a type field 520, a size field 530, a time field 540, a source field 550, and/or a variety of entries 560 associated with fields 510-550.

Program field 510 may include names of content recorded by STB/DVR 120. For example, program field 510 may include entries 560 for "Hollywood Squares," "Joe's 1st Birthday," "Movie Trailer," etc.

Type field 520 may include entries 560 providing types associated with the programs provided in program field 510. For example, type field 520 may indicate that "Hollywood Squares" (e.g., provided in program field 510) is a TV program, that "Joe's 1st Birthday" (e.g., provided in program field 510) is a home movie, and that "Movie Trailer" (e.g., provided in program field 510) is a web movie.

Size field 530 may include entries 560 providing storage sizes associated with the programs provided in program field 510. For example, size field 530 may indicate that "Hollywood Squares" (e.g., provided in program field 510) is "3" megabytes (MB) in size, that "Joe's 1st Birthday" (e.g., provided in program field 510) is "1" MB in size, and that "Movie Trailer" (e.g., provided in program field 510) is "0.1" MB in size.

Time field 540 may include entries 560 providing lengths of time associated with the programs provided in program field 510. For example, time field 540 may indicate that "Hollywood Squares" (e.g., provided in program field 510) is "30" minutes in length, that "Joe's 1st Birthday" (e.g., provided in program field 510) is "15" minutes in length, and that "Movie Trailer" (e.g., provided in program field 510) is "2" minutes in length.

Source field 550 may include entries 560 indicating a source device for viewing the programs provided in program field 510. For example, source field 550 may indicate that "Hollywood Squares" (e.g., provided in program field 510) may be viewed on STB/DVR 120, that "Joe's 1st Birthday" (e.g., provided in program field 510) may be viewed on a mobile phone, and that "Movie Trailer" (e.g., provided in program field 510) may be viewed on a computer. In one implementation, if the programs provided in program field 510 are recorded in a format (e.g., in a television format) for the device specified in source field 550 and a user wishes to view the programs with a device requiring a different format (e.g., a mobile phone format), the programs provided in program field 510 may be transcoded to a format capable of being displayed by the device specified by the user.

Although FIG. 5 shows exemplary information that may be provided in database portion 500, in other implementations, database portion 500 may contain fewer, different, or additional information than depicted in FIG. 5.

FIG. 6 depicts a diagram of a portion 600 of an exemplary database capable of being provided in and/or managed by content server 140. In one implementation, the information provided in database portion 600 may be provided by content server 140 when a user records and/or uploads content with STB/DVR 120 and/or user device 150. As illustrated, database portion 600 may include a variety of information associated with content. For example, database portion 600 may include a program field 610, a type field 620, a size field 630, a time field 640, a source field 650, and/or a variety of entries 660 associated with fields 610-640.

Program field 610 may include names of content stored by content server 140. For example, program field 610 may include entries 660 for "Wheel of Fortune," "4th of July," "News Clip," etc. Program field 610 may further include content metadata associated with recorded programs (e.g., "4th of July" may include a description of the content, actors, year filmed, etc.). Alternatively and/or additionally, content metadata may be stored on STB/DVR 120 and/or user device 150.

Type field 620 may include entries 660 providing types associated with the programs provided in program field 610. For example, type field 620 may indicate that "Wheel of Fortune" (e.g., provided in program field 610) is a TV program, that "4th of July" (e.g., provided in program field 610) is a home movie, and that "News Clip" (e.g., provided in program field 610) is web news.

Size field 630 may include entries 660 providing storage sizes associated with the programs provided in program field 610. For example, size field 630 may indicate that "Wheel of Fortune" (e.g., provided in program field 610) is "2.5" MB in size, that "4th of July" (e.g., provided in program field 610) is "0.5" MB in size, and that "News Clip" (e.g., provided in program field 610) is "0.1" MB in size.

Time field 640 may include entries 660 providing lengths of time associated with the programs provided in program field 610. For example, time field 640 may indicate that "Wheel of Fortune" (e.g., provided in program field 610) is "25" minutes in length, that "4th of July" (e.g., provided in program field 610) is "5" minutes in length, and that "News Clip" (e.g., provided in program field 610) is "2" minutes in length.

Source field 650 may include entries 660 indicating a source device for viewing the programs provided in program field 610. For example, source field 650 may indicate that "Wheel of Fortune" (e.g., provided in program field 610) is to be viewed on STB/DVR 120, that "4th of July" (e.g., provided in program field 610) is to be viewed on a mobile phone, and that "News Clip" (e.g., provided in program field 610) is to be viewed on a computer. In one implementation, if the programs provided in program field 610 are recorded in a format (e.g., in a television format) for the device specified in source field 650 and a user wishes to view the programs with a device requiring a different format (e.g., a mobile phone format), the programs provided in program field 610 may be transcoded to a format capable of being displayed by the device specified by the user.

Although FIG. 6 shows exemplary information that may be provided in database portion 600, in other implementations, database portion 600 may contain fewer, different, or additional information than depicted in FIG. 6. For example, database portion 600 may include a timestamp field that indicates a time left in a program. Some programs may not be stored indefinitely and may include a timestamp that lets a subscriber store them for a specific time period (e.g., twenty-four hours, two weeks, etc.). A timestamp field may indicate the amount of time remaining on such recorded content. In another example, database portion 600 may include a user specific field where a user may describe content. Such a field may be used to identify a particular episode of a TV show (e.g., "Favorite episode of The Shield"). In still another example, database portion 600 may include a STB/subscriber identifier field for security and/or authentication purposes (e.g., content may need to be kept separate, from one user to another, for security reasons and/or content protection reasons).

Figure 7:
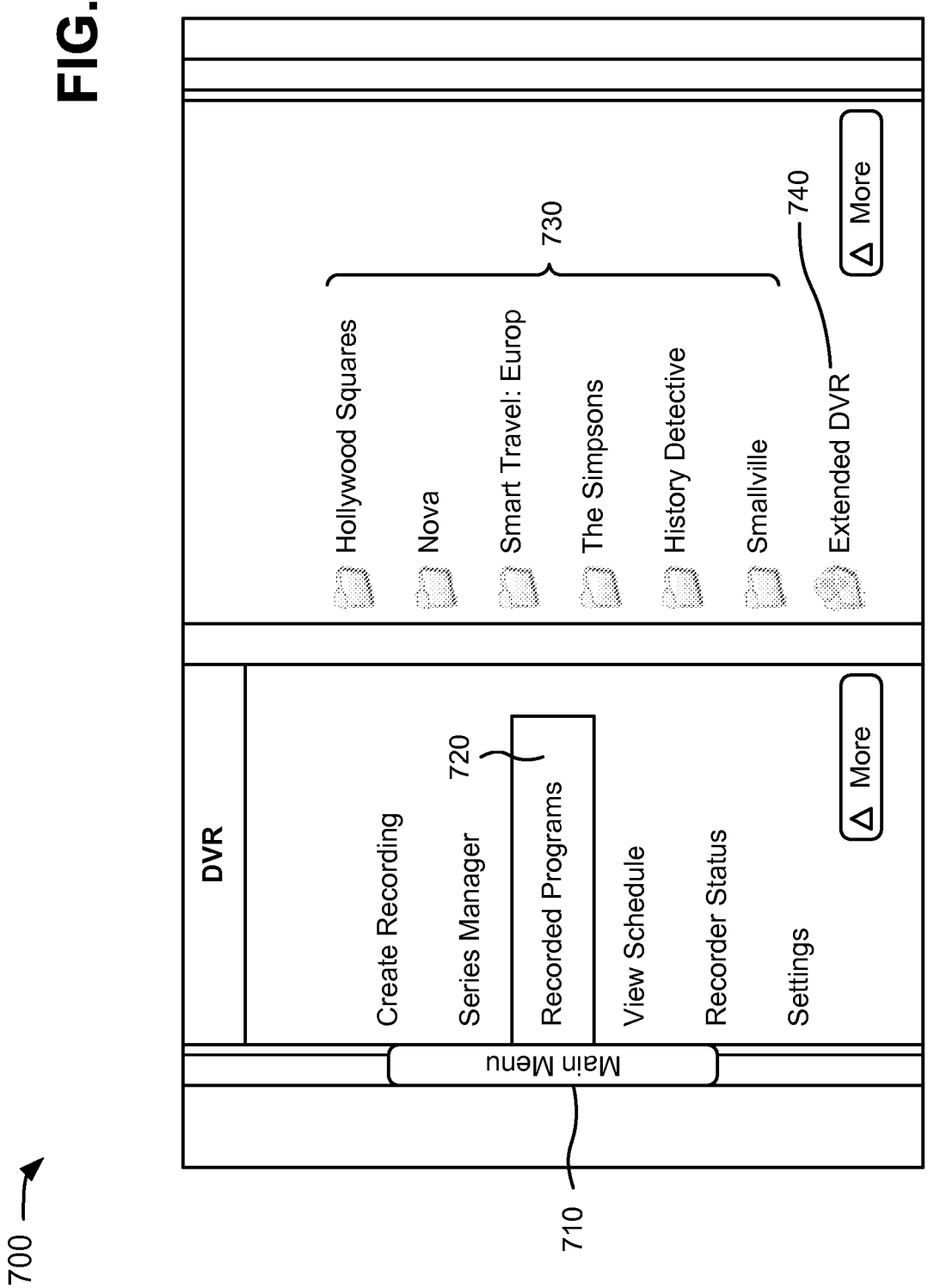
FIG. 7 depicts a diagram of an exemplary recorded programs user interface capable of being generated by the content server of the network illustrated in FIG. 1.

FIG. 7 depicts a diagram of an exemplary recorded programs user interface 700 capable of being generated by content server 140. As illustrated, recorded programs user interface 700 may include a main menu 710, a recorded programs entry 720, a DVR recorded programs section 730, and/or an extended DVR recorded programs section 740. Recorded programs user interface 700 may be displayed to a user of STB/DVR 120 and/or user device 150. Information associated with recorded programs user interface 700 may be selected by a user of STB/DVR 120 and/or user device 150 (e.g., via input device 260 and/or output device 270 (e.g., a touch-screen display)).

Main menu 710 may include a variety of selectable information associated with STB/DVR 120 and the extended DVR service (e.g., provided by content server 140). For example, main menu 410 may provide a create recording entry, a series manager entry, recorded programs entry 720, a view schedule entry, a recorder status entry, and a settings entry. The create recording entry, if selected, may provide information (e.g., a source of the recording (e.g., a TV broadcast, an Internet video recording, a mobile phone recording, etc.), a format (e.g., resolution, size, etc.) of the recording, etc.) associated with creation of a recording via STB/DVR 120 and/or user device 150. The series manager entry, if selected, may provide information associated with managing recordation of a series (e.g., a TV series) via STB/DVR 120 and/or user device 150. Recorded programs entry 720, when selected (as depicted in FIG. 7), may provide information associated with programs stored on STB/DVR 120 and/or content server 140, such as the information depicted by recorded programs user interface 700. The view schedule entry, if selected, may provide information associated with a schedule of television programs. The recorder status entry, if selected, may provide information associated with a capacity of STB/DVR 120 and/or content server 140. The settings entry, if selected, may provide settings information associated with STB/DVR 120 and/or content server 140.

DVR recorded programs section 730 may provide a variety of information associated with programs stored on STB/DVR 120. For example, DVR recorded programs section 730 may provide names of programs recorded to STB/DVR 120 (e.g., "Hollywood Squares," "Nova," "Smart Travel: Europ," "The Simpsons," "History Detective," and "Smallville"). In one implementation, the programs recorded and/or uploaded to content server 140 may be provided with the programs provided in DVR recorded programs section 730.

Extended DVR recorded programs section 740 may provide a variety of information associated with programs stored on content server 140. In one implementation, extended DVR recorded programs section 740 may provide the programs stored on content server 140 in a folder (e.g., "Extended DVR" folder) that is separate from the programs stored on STB/DVR 120 (e.g., the programs provided in DVR recorded programs section 730). In another implementation, the programs stored on content server 140 (e.g., the programs provided in the folder of extended DVR recorded programs section 740) may be mixed with the programs stored on STB/DVR 120 (e.g., the programs provided in DVR recorded programs section 730). An indicator (e.g., an icon) may be provided with the programs stored on content server 140 to indicate that such programs are stored on content server 140 rather than on STB/DVR 120. The indicator may indicate that a recorded program is for a particular output device (e.g., a mobile phone, TV, etc.), and may provide an option of transcoding the recorded program for a different output device.

Although recorded programs user interface 700 depicts a variety of information, in other implementations, recorded programs user interface 700 may depict fewer, different, or additional information than depicted in FIG. 7.

Figure 8:
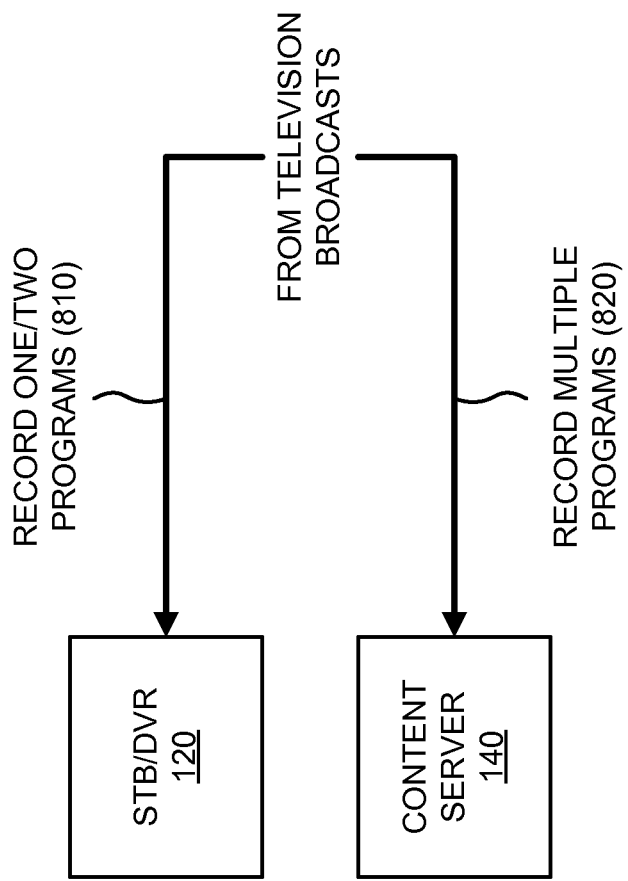
FIG. 8 illustrates a diagram of an exemplary portion of the network depicted in FIG. 1.

FIG. 8 illustrates a diagram of an exemplary portion 800 of network 100. As illustrated, exemplary network portion 800 may include STB/DVR 120 and content server 140. STB/DVR 120 and content server 140 may include the features described above in connection with, for example, FIG. 1.

As further shown in FIG. 8, one or two TV programs 810 (e.g., from television broadcasts) may be simultaneously recorded by STB/DVR 120, and multiple (e.g., more than two) TV programs 820 from the television broadcasts may be simultaneously recorded by content server 140. STB/DVR 120 may receive one/two TV programs 810, and may store one/two TV programs 810 (e.g., locally within STB/DVR 120). Content server 140 may receive multiple programs 820, and may store multiple programs 820 (e.g., within the storage allocated to the user associated with STB/DVR 120).

Such an arrangement may appeal to STB/DVR users who need more storage for their recorded and/or uploaded content, as well as for users who may wish to record more than two programs simultaneously. By enabling users of STB/DVR 120 to purchase storage space in content server 140, the users may be able to simultaneously record more than two programs (e.g., TV programs) in the purchased storage space.

Although FIG. 8 show exemplary components of network portion 800, in other implementations, network portion 800 may contain fewer, different, or additional components than depicted in FIG. 8. In still other implementations, one or more components of network portion 800 may perform one or more other tasks described as being performed by one or more other components of network portion 800.

Figure 9:
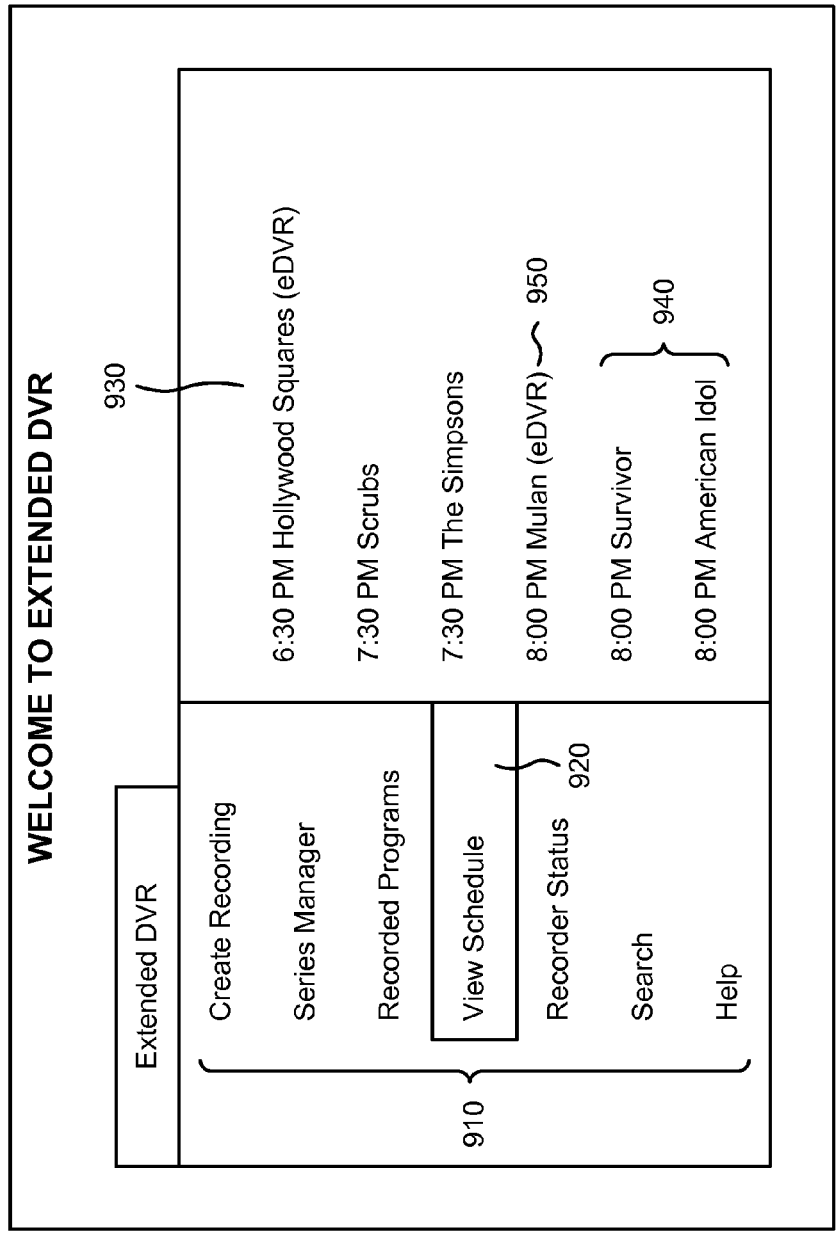
FIG. 9 depicts a diagram of an exemplary view schedule user interface capable of being generated by the content server of the network illustrated in FIG. 1.

FIG. 9 depicts a diagram of an exemplary view schedule user interface 900 capable of being generated by content server 140. As illustrated, view schedule user interface 900 may include a main menu 910, a view schedule entry 920, a scheduling section 930, programs 940 to be recorded by STB/DVR 120, and/or a program 950 to be recorded by content server 140. View schedule user interface 900 may be displayed to a user of STB/DVR 120 and/or user device 150. Information associated with view schedule user interface 900 may be selected by a user of STB/DVR 120 and/or user device 150 (e.g., via input device 260 and/or output device 270 (e.g., a touch-screen display)).

Main menu 910 may include a variety of selectable information associated with STB/DVR 120 and the extended DVR service (e.g., provided by content server 140). For example, main menu 910 may provide a create recording entry, a series manager entry, a recorded programs entry, view schedule entry 920, a recorder status entry, a search entry, and/or a help entry. The create recording entry, if selected, may provide information associated with creation of a recording via STB/DVR 120 and/or user device 150. The series manager entry, if selected, may provide information associated with managing recordation of a series (e.g., a TV series) via STB/DVR 120 and/or user device 150. The recorded programs entry, if selected, may provide information associated with programs stored on STB/DVR 120 and/or content server 140. View schedule entry 920, when selected (e.g., as depicted in FIG. 9), may provide information associated with a schedule of television programs to be recorded by STB/DVR 120 and/or content server 140, such as the information depicted by view schedule user interface 900. The recorder status entry, if selected, may provide information associated with a capacity of STB/DVR 120 and/or content server 140. The search entry, if selected, may provide information that enables a user of STB/DVR 120 and/or user device 150 to search for content stored on STB/DVR 120 and/or content server 140. The help entry, if selected, may provide help information associated with STB/DVR 120 and/or content server 140.

Scheduling section 930 may provide a variety of information associated with programs to be recorded on STB/DVR 120 and/or content server 140. For example, scheduling section 930 may provide names of programs to be recorded to STB/DVR 120 (e.g., "Scrubs," "The Simpsons," "Survivor," and "American Idol"), and names of programs to be recorded to content server 140 (e.g., "Hollywood Squares" and "Mulan"). As further shown in FIG. 9, scheduling section 930 may indicate that three programs (e.g., programs 940 and program 950) are to be recorded simultaneously at 8:00 PM. Such an arrangement may appeal to users who wish to record more than two programs simultaneously. By enabling users of STB/DVR 120 to purchase storage space in content server 140, the users may be able to simultaneously record more than two programs (e.g., "Mulan," "Survivor," and "American Idol").

Although view schedule user interface 900 depicts a variety of information, in other implementations, view schedule user interface 900 may depict fewer, different, or additional information than depicted in FIG. 9.

Figure 10:
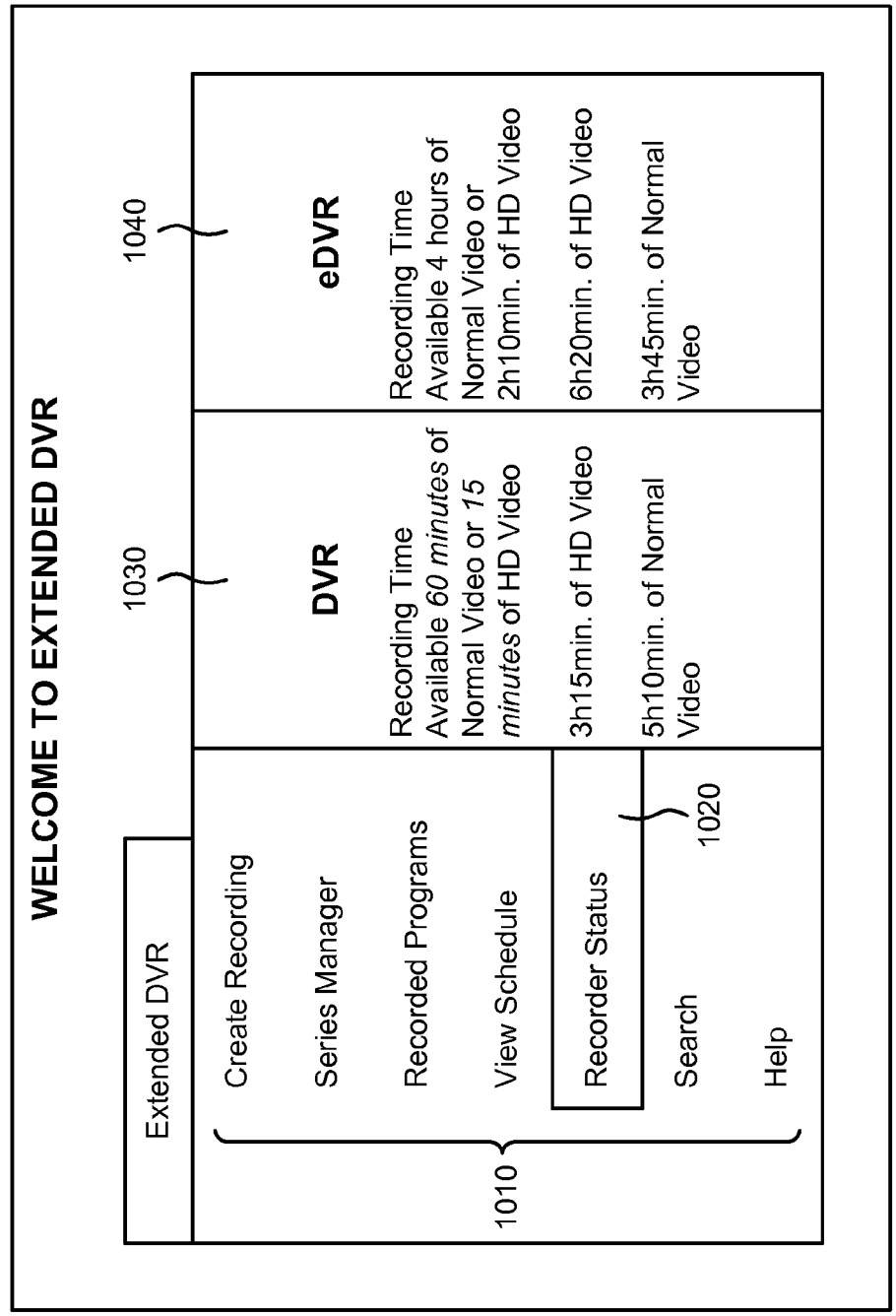
FIG. 10 illustrates a diagram of an exemplary recorder status user interface capable of being generated by the content server of the network depicted in FIG. 1.

FIG. 10 illustrates a diagram of an exemplary recorder status user interface 1000 capable of being generated by content server 140. As illustrated, recorder status user interface 1000 may include a main menu 1010, a recorder status entry 1020, a DVR capacity section 1030, and/or an extended DVR capacity section 1040. Recorder status user interface 1000 may be displayed to a user of STB/DVR 120 and/or user device 150. Information associated with recorder status user interface 1000 may be selected by a user of STB/DVR 120 and/or user device 150 (e.g., via input device 260 and/or output device 270 (e.g., a touch-screen display)).

Main menu 1010 may include a variety of selectable information associated with STB/DVR 120 and the extended DVR service (e.g., provided by content server 140). For example, main menu 1010 may provide a create recording entry, a series manager entry, a recorded programs entry, a view schedule entry, recorder status entry 1020, a search entry, and/or a help entry. The create recording entry, if selected, may provide information associated with creation of a recording via STB/DVR 120 and/or user device 150. The series manager entry, if selected, may provide information associated with managing recordation of a series (e.g., a TV series) via STB/DVR 120 and/or user device 150. The recorded programs entry, if selected, may provide information associated with programs stored on STB/DVR 120 and/or content server 140. The view schedule entry, if selected, may provide information associated with a schedule of television programs to be recorded by STB/DVR 120 and/or content server 140. Recorder status entry 1020, when selected (e.g., as depicted in FIG. 10), may provide information associated with a capacity of STB/DVR 120 and/or content server 140, such as the information depicted by recorder status user interface 1000. The search entry, if selected, may provide information that enables a user of STB/DVR 120 and/or user device 150 to search for content stored on STB/DVR 120 and/or content server 140. The help entry, if selected, may provide help information associated with STB/DVR 120 and/or content server 140.

DVR capacity section 1030 may provide a variety of information associated with the capacity of STB/DVR 120. For example, DVR capacity section 1030 may provide an amount of available recording time (e.g., "Recording Time Available 60 minutes of Normal Video or 15 minutes of HD Video") associated with STB/DVR 120. DVR capacity section 1030 may provide an amount of HD video (e.g., "3 h 15 min. of HD Video") stored by STB/DVR 120, and an amount of normal video (e.g., "5 h 10 min. of Normal Video") stored by STB/DVR 120.

Extended DVR capacity section 1040 may provide a variety of information associated with the capacity of content server 140 (e.g., for a particular user associated with STB/DVR 120). For example, extended DVR capacity section 1040 may provide an amount of available recording time (e.g., "Recording Time Available 4 hours of Normal Video or 2 h 10 min of HD Video") associated with content server 140. Extended DVR capacity section 1040 may provide an amount of HD video (e.g., "6 h 20 min. of HD Video") stored by content server 140 for the particular user, and an amount of normal video (e.g., "3 h 45 min. of Normal Video") stored by content server 140 for the particular user. Extended DVR capacity section 1040 may further indicate that additional storage (or capacity) may be purchased from content server 140.

Although recorder status user interface 1000 depicts a variety of information, in other implementations, recorder status user interface 1000 may depict fewer, different, or additional information than depicted in FIG. 10.

Figure 11:
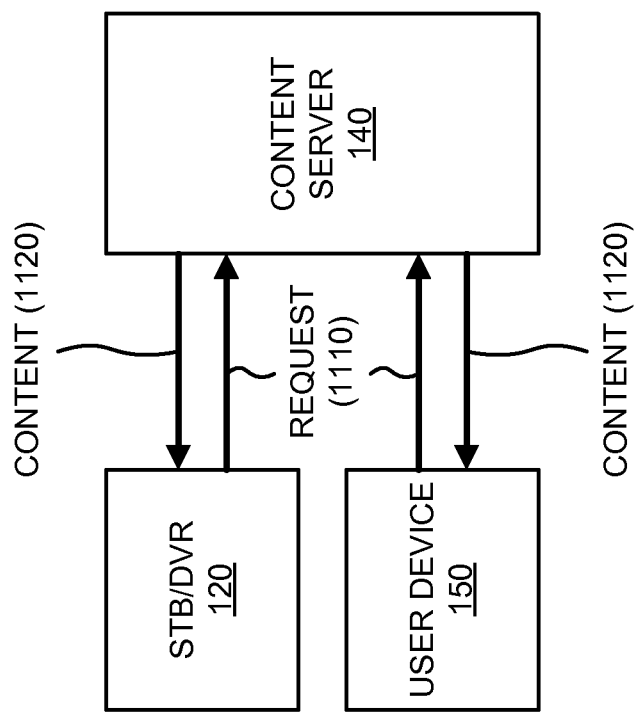
FIG. 11 depicts a diagram of an exemplary portion of the network illustrated in FIG. 1.

FIG. 11 depicts a diagram of an exemplary portion 1100 of network 100. As illustrated, exemplary network portion 1100 may include STB/DVR 120, content server 140, and user device 150. STB/DVR 120, content server 140, and user device 150 may include the features described above in connection with, for example, FIG. 1.

As further shown in FIG. 11, STB/DVR 120 and/or user device 150 may generate a request 1110 to view content, and may provide request 1110 to content server 140. Content server 140 may receive request 1110, and may retrieve the requested content (e.g., identified in request 1110) from storage allocated to a user of STB/DVR 120 and/or user device 150. Content server 140 may provide the requested content (e.g., content 1120) to STB/DVR 120 and/or user device 150. Such an arrangement may enable the user to view content 1120 on a variety of devices. For example, the user could view content 1120 on a mobile telephone, on a personal computer, on a television (e.g., via STB/DVR 120), etc. If content 1120 was originally recorded in one format (e.g., a standard definition (SD) or high definition (HD) broadcast stream for TV), content 1120 may be transcoded to a different format (e.g., a lower resolution) for viewing on other devices (e.g., devices with lower resolution, such as mobile phones or PDAs).

Although FIG. 11 show exemplary components of network portion 1100, in other implementations, network portion 1100 may contain fewer, different, or additional components than depicted in FIG. 11. For example, if content 1120 is to be transcoded to a different format, content 1120 may first be transcoded (e.g., by content server 140) to a format suitable for STB/DVR 120 and/or user device 150, before being provided to STB/DVR 120 and/or user device 150. In still other implementations, one or more components of network portion 1100 may perform one or more other tasks described as being performed by one or more other components of network portion 1100.

Figure 12:
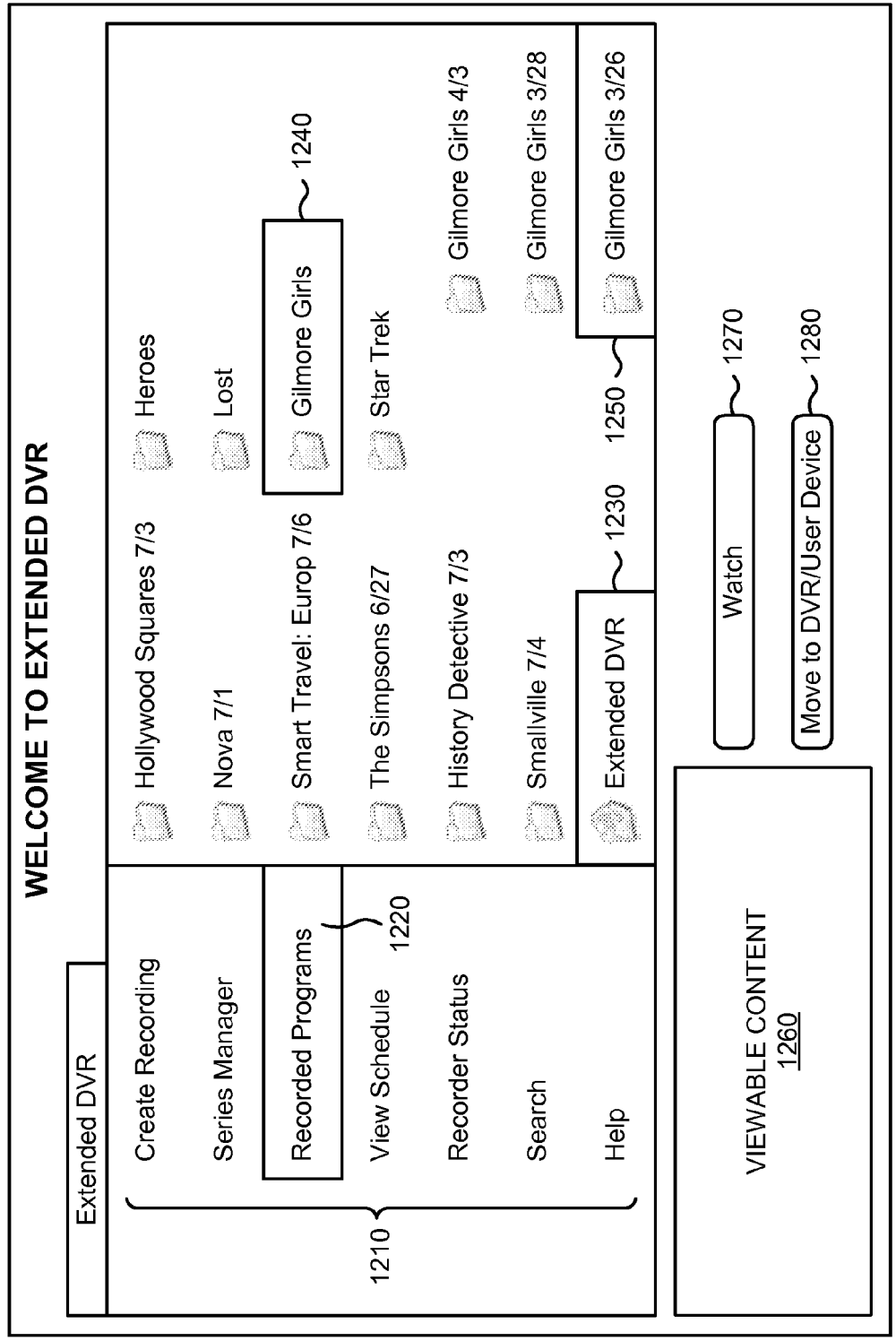
FIG. 12 illustrates a diagram of an exemplary recorded programs user interface capable of being generated by the content server of the network depicted in FIG. 1.

FIG. 12 illustrates a diagram of an exemplary recorded programs user interface 1200 capable of being generated by content server 140. As illustrated, recorded programs user interface 1200 may include a main menu 1210, a recorded programs entry 1220, an extended DVR folder 1230, an extended DVR program 1240, an episode 1250, a viewable content window 1260, a first selection mechanism 1270, and a second selection mechanism 1280. Recorded programs user interface 1200 may be displayed to a user of STB/DVR 120 and/or user device 150. Information associated with recorded programs user interface 1200 may be selected by a user of STB/DVR 120 and/or user device 150 (e.g., via input device 260 and/or output device 270 (e.g., a touch-screen display)).

Main menu 1210 may include a variety of selectable information associated with STB/DVR 120 and the extended DVR service (e.g., provided by content server 140). For example, main menu 1210 may provide a create recording entry, a series manager entry, recorded programs entry 1220, a view schedule entry, a recorder status entry, a search entry, and/or a help entry. The create recording entry, if selected, may provide information associated with creation of a recording via STB/DVR 120 and/or user device 150. The series manager entry, if selected, may provide information associated with managing recordation of a series (e.g., a TV series) via STB/DVR 120 and/or user device 150. Recorded programs entry 1220, when selected (e.g., as depicted in FIG. 12), may provide information associated with programs stored on STB/DVR 120 and/or content server 140, such as the information depicted by recorded programs user interface 1200. The view schedule entry, if selected, may provide information associated with a schedule of television programs to be recorded by STB/DVR 120 and/or content server 140. The recorder status entry, if selected, may provide information associated with a capacity of STB/DVR 120 and/or content server 140. The search entry, if selected, may provide information that enables a user of STB/DVR 120 and/or user device 150 to search for content stored on STB/DVR 120 and/or content server 140. The help entry, if selected, may provide help information associated with STB/DVR 120 and/or content server 140.

As further shown in FIG. 12, if a user selects recorded programs entry 1220, one or more names of programs (e.g., "Hollywood Squares 7/3," "Extended DVR," etc.) stored on STB/DVR 120 and/or content server 140 may be displayed. If the user selects extended DVR folder 1230, one or more names of extended DVR programs (e.g., "Heroes," "Lost," "Gilmore Girls," and "Star Trek") stored on content server 140 may be displayed. If the user selects extended DVR program 1240 (e.g., "Gilmore Girls"), one or more episodes stored on content server 140 may be displayed. If the user selects episode 1250 (e.g., "Gilmore Girls 3/26"), content associated with episode 1250 may be displayed in viewable content window 1260. Alternatively, if the user selects one of the names of the programs stored on STB/DVR 120 (e.g., "Hollywood Squares 7/3"), content server 140 may send a request to enable STB/DVR 120 to retrieve the selected program from STB/DVR 120. The retrieved, selected program may be displayed in viewable content window 1260.

Viewable content window 1260 may include a window capable of displaying content associated with the selected program (e.g., content associated with episode 1250). The user may watch the content in viewable content window 1260 by selecting first selection mechanism 1270 (e.g., an icon, a button, a link, etc.). Alternatively and/or additionally, the user may transfer the content provided in viewable content window 1260 to STB/DVR 120 and/or user device 150 by selecting second selection mechanism 1280 (e.g., an icon, a button, a link, etc.). In other implementations, the user may watch the content on television 110.

Although recorded programs user interface 1200 depicts a variety of information, in other implementations, recorded programs user interface 1200 may depict fewer, different, or additional information than depicted in FIG. 12.

Figure 13:
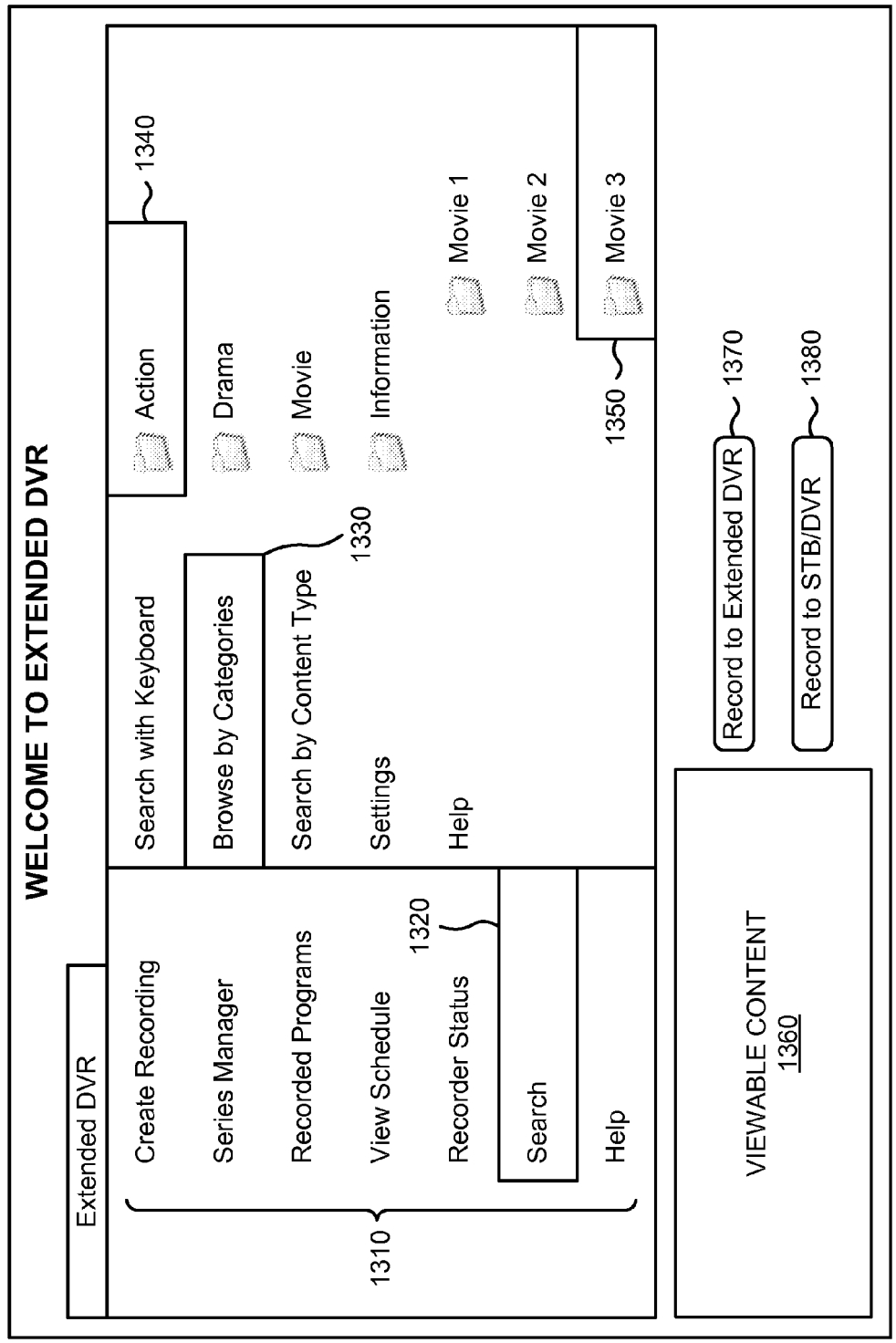
FIG. 13 depicts a diagram of an exemplary search user interface capable of being generated by the content server of the network illustrated in FIG. 1.

FIG. 13 illustrates a diagram of an exemplary search user interface 1300 capable of being generated by content server 140. As illustrated, search user interface 1300 may include a main menu 1310, a search entry 1320, a browse categories option 1330, a category 1340, a movie 1350, a viewable content window 1360, a first selection mechanism 1370, and a second selection mechanism 1380. Search user interface 1300 may be displayed to a user of STB/DVR 120 and/or user device 150. Information associated with search user interface 1300 may be selected by a user of STB/DVR 120 and/or user device 150 (e.g., via input device 260 and/or output device 270 (e.g., a touch-screen display)).

Main menu 1310 may include a variety of selectable information associated with STB/DVR 120 and the extended DVR service (e.g., provided by content server 140). For example, main menu 1310 may provide a create recording entry, a series manager entry, a recorded programs entry, a view schedule entry, a recorder status entry, search entry 1320, and/or a help entry. The create recording entry, if selected, may provide information associated with creation of a recording via STB/DVR 120 and/or user device 150. The series manager entry, if selected, may provide information associated with managing recordation of a series (e.g., a TV series) via STB/DVR 120 and/or user device 150. The recorded programs entry, if selected, may provide information associated with programs stored on STB/DVR 120 and/or content server 140. The view schedule entry, if selected, may provide information associated with a schedule of television programs to be recorded by STB/DVR 120 and/or content server 140. The recorder status entry, if selected, may provide information associated with a capacity of STB/DVR 120 and/or content server 140. Search entry 1320, when selected (e.g., as depicted in FIG. 13), may provide information that enables a user of STB/DVR 120 and/or user device 150 to search for content stored on STB/DVR 120 and/or content server 140, such as the information depicted by search user interface 1300. The help entry, if selected, may provide help information associated with STB/DVR 120 and/or content server 140.

As further shown in FIG. 13, if a user selects search entry 1320, one or more options (e.g., "Search with Keyboard," "Browse by Categories," etc.) for searching content provided on STB/DVR 120 and/or content server 140 may be displayed. If the user selects browse categories option 1330, one or more content categories (e.g., "Action," "Drama," "Movie," and "Information") may be displayed. If the user selects category 1340 (e.g., "Action"), one or more movies stored on STB/DVR 120 and/or content server 140 may be displayed. If the user selects movie 1350 (e.g., "Movie 3"), content associated with movie 1350 may be displayed in viewable content window 1360.

Viewable content window 1360 may include a window capable of displaying content associated with the selected movie (e.g., content associated with movie 1350). The user may record the content provided in viewable content window 1360 to content server 140 by selecting first selection mechanism 1370 (e.g., an icon, a button, a link, etc.). Alternatively and/or additionally, the user may record the content provided in viewable content window 1360 to STB/DVR 120 and/or user device 150 by selecting second selection mechanism 1380 (e.g., an icon, a button, a link, etc.).

Although search user interface 1300 depicts a variety of information, in other implementations, search user interface 1300 may depict fewer, different, or additional information than depicted in FIG. 13.

Figure 14:
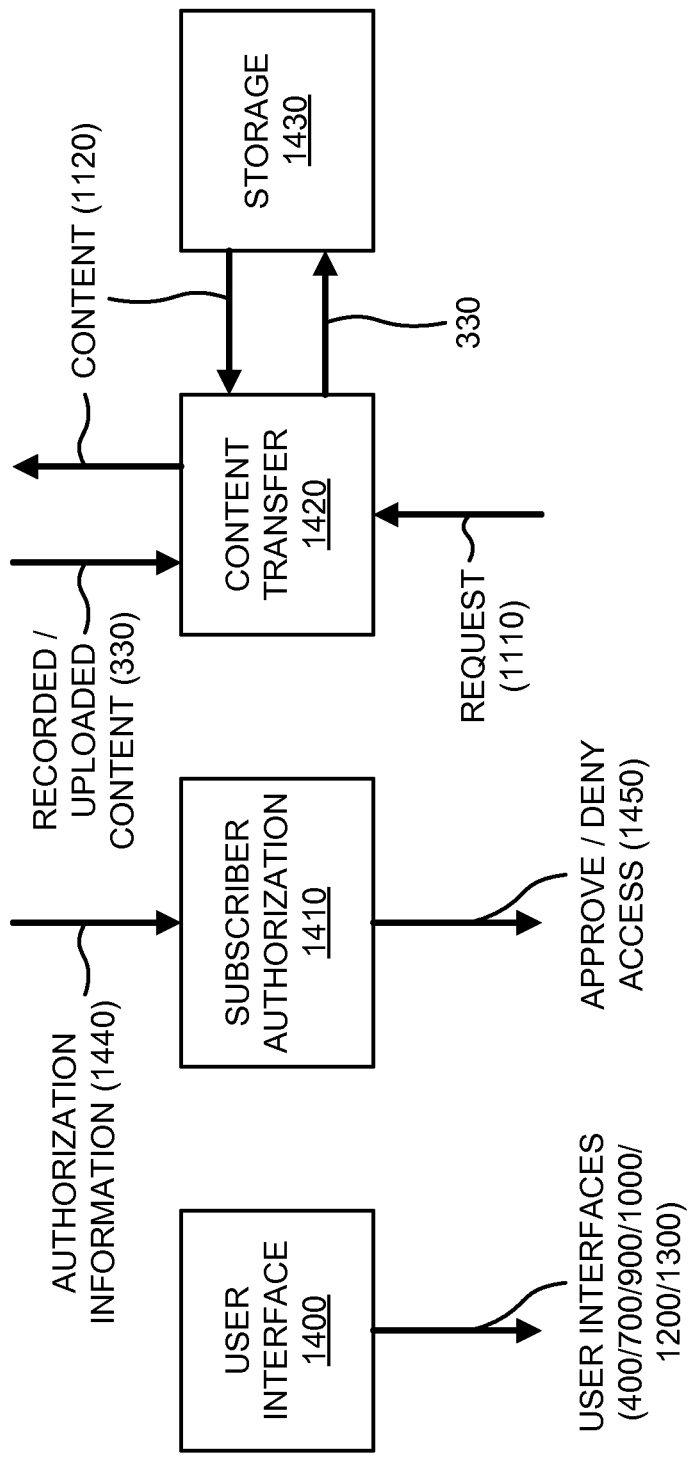
FIG. 14 illustrates a diagram of exemplary functional components of the content server of the network depicted in FIG. 1.

FIG. 14 illustrates a diagram of exemplary functional components of content server 140. As illustrated, content server 140 may include user interface logic 1400, subscriber authorization logic 1410, content transfer logic 1420, and storage 1430. The functions described in FIG. 14 may be performed by one or more of the exemplary components of device 200 depicted in FIG. 2.

User interface logic 1400 may include any hardware, software, or combination of hardware and software based logic (e.g., processing logic 220) that enables content server 140 to generate user interfaces, and to provide the generated user interfaces to STB/DVR 120 and/or user device 150. In one example, user interface logic 1400 may generate user interfaces 400, 700, 900, 1000, 1200, and 1300, described above in connection with FIGS. 4, 7, 9, 10, 12, and 13, respectively.

Subscriber authorization logic 1410 may include any hardware, software, or combination of hardware and software based logic (e.g., processing logic 220) that receives authorization information 1440 (e.g., a username, a password, login information, etc.) associated with a user of content server 140, and approves or denies access 1450 to content server 140 (e.g., to the extended DVR server provided by content server 140) based on authorization information 1440.

Content transfer logic 1420 may include any hardware, software, or combination of hardware and software based logic (e.g., processing logic 220) that receives (e.g., from STB/DVR 120 and/or user device 150) recorded and/or uploaded content 330, and provides recorded/uploaded content 330 to storage 1430. Content transfer logic 1420 may receive request 1110 to view content from STB/DVR 120 and/or user device 150, and may retrieve content 1120 from storage 1430 based on request 1110. Content transfer logic 1420 may provide content 1120 to STB/DVR 120 and/or user device 150. If content 1120 was originally recorded in one format (e.g., a SD or HD broadcast stream for TV), content transfer logic 1420 may transcode content 1120 to a different format (e.g., a lower resolution) for viewing on other devices (e.g., devices with lower resolution, such as mobile phones or PDAs), depending on the destination of content 1120.

Storage 1430 may include a storage device (e.g., main memory 230, ROM 240, storage device 250, etc.) that may store content (e.g., recorded/uploaded content 330) associated with the extended DVR service.

Although FIG. 14 shows exemplary functional components of content server 140, in other implementations, content server 140 may contain fewer, different, or additional functional components than depicted in FIG. 14. In still other implementations, one or more functional components of content server 140 may perform one or more other tasks described as being performed by one or more other functional components of content server 140.

FIGS. 15-18 illustrate flow charts of an exemplary process 1500 for providing the extended DVR service, according to implementations described herein. In one implementation, process 1500 may be performed by content server 140. In another implementation, some or all of process 1500 may be performed by another device or group of devices, including or excluding content server 140.

Figure 15:
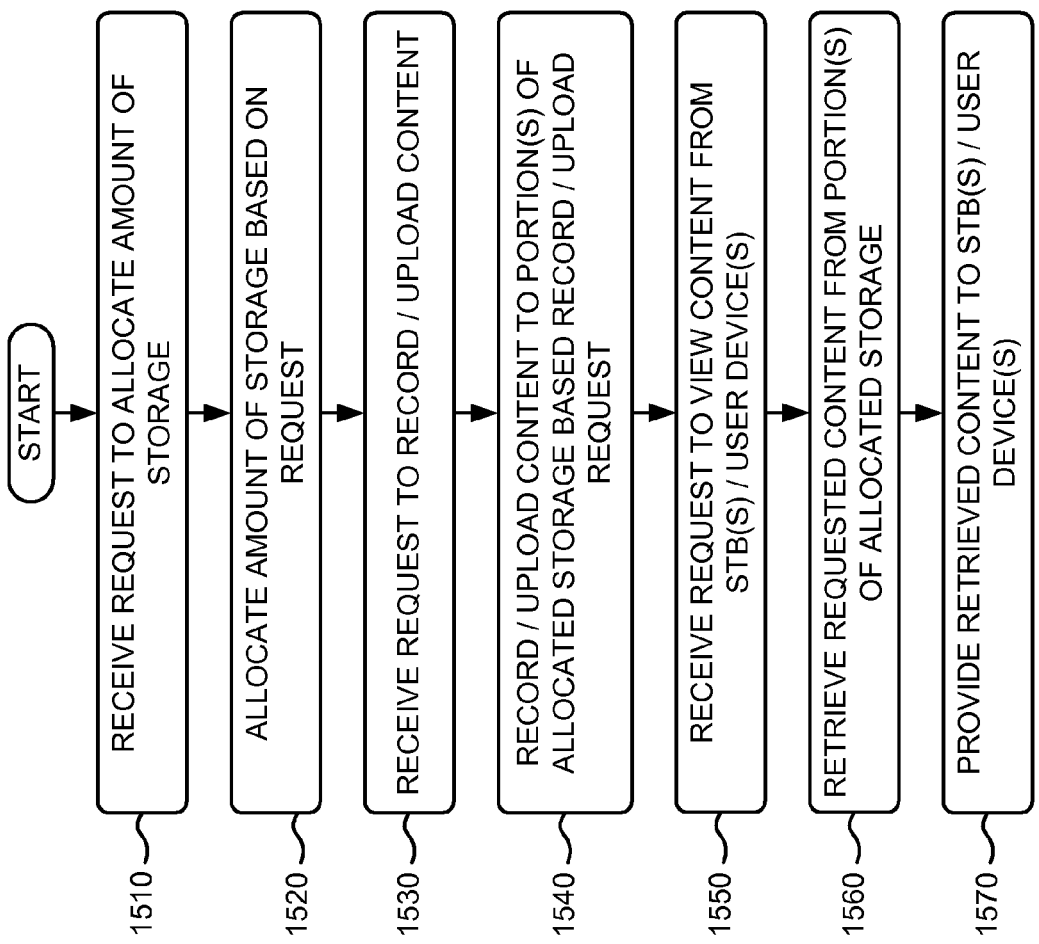
FIGS. 15-18 illustrate flow charts of an exemplary process according to implementations described herein.

As illustrated in FIG. 15, process 1500 may begin with receipt of a request to allocate an amount of storage (block 1510), and an allocation of the amount of storage based on the request (block 1520). For example, in implementations described above in connection with FIG. 3, content server 140 may provide an offer to purchase content storage, as indicated by reference number 310, to STB/DVR 120 and/or user device 150. STB/DVR 120 and/or user device 150 may receive offer 310, and may purchase content storage, as indicated by reference number 320, from content server 140. In one example, STB/DVR 120 and/or user device 150 may provide a request to allocate an amount of storage (e.g., associated with content server 140) when STB/DVR 120 and/or user device 150 purchases the content storage. Content server 140 may receive the request, and may allocate the amount of storage based on the request.

As further shown in FIG. 15, a request to record and/or upload content may be received (block 1530), and the content may be recorded and/or uploaded to one or more portions of the allocated storage based on the record/upload request (block 1540). For example, in implementations described above in connection with FIG. 3, STB/DVR 120 and/or user device 150 may request that content (e.g., TV programming) be recorded by content server 140 and/or may upload content (e.g., a home movie, a web movie, etc.) to content server 140, as indicated by reference number 330. In one example, STB/DVR 120 and user device 150 may provide a request to record and/or upload content to content server 140, and content server 140 may receive the record/upload request. Content server 140 may record the requested content, and may provide the recorded content to one or more portions of the storage allocated to STB/DVR 120 and/or user device 150. Alternatively and/or additionally, content server 140 may receive the uploaded content, and may provide the uploaded content to one or more portions of the storage allocated to STB/DVR 120 and/or user device 150.

Returning to FIG. 15, a request to view content may be received from one or more STBs and/or user devices (block 1550), the requested content may be retrieved from one or more portions of the allocated storage (block 1560), and the retrieved content may be provided to the one or more STBs and/or user devices (block 1570). For example, in implementations described above in connection with FIG. 11, STB/DVR 120 and/or user device 150 may generate request 1110 to view content, and may provide request 1110 to content server 140. Content server 140 may receive request 1110, and may retrieve the requested content (e.g., provided in request 1110) from storage allocated to a user of STB/DVR 120 and/or user device 150. Content server 140 may provide the requested content (e.g., content 1120) to STB/DVR 120 and/or user device 150. Such an arrangement may enable the user to view content 1120 on a variety of devices. In one example, the user could view content 1120 on a mobile telephone, on a personal computer, on a television (e.g., via STB/DVR 120), etc. If content 1120 was originally recorded in one format (e.g., a broadcast stream for TV), content server 140 may transcode content 1120 to a different format (e.g., a lower resolution) for viewing on other devices (e.g., devices with lower resolution, such as mobile phones or PDAs), depending on the destination of content 1120.

Figure 16:
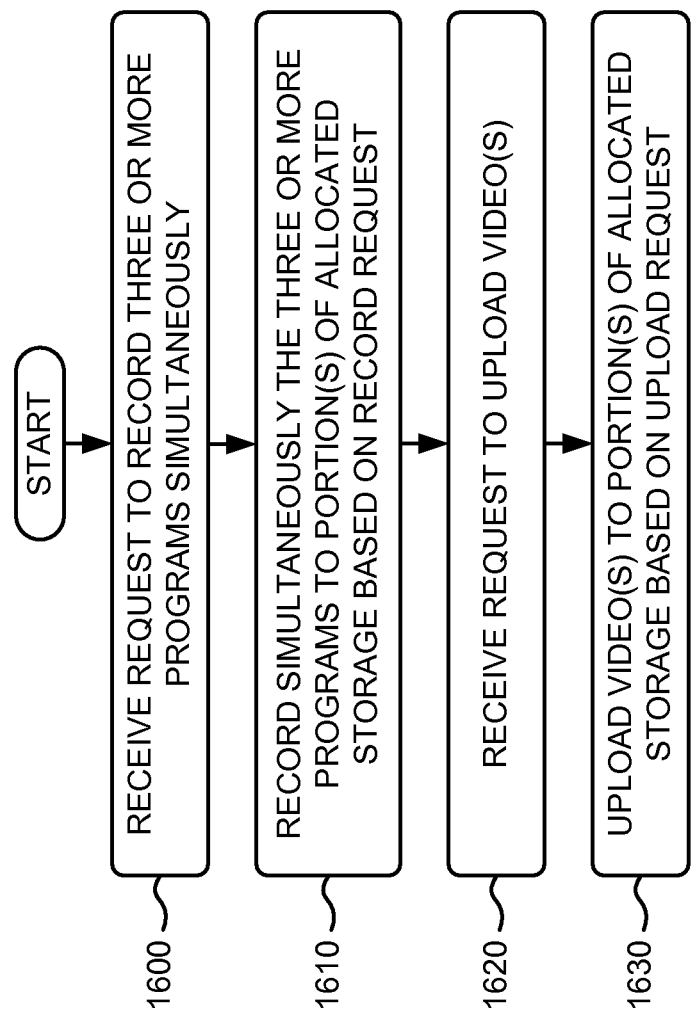

Process blocks 1530/1540 may include the process blocks depicted in FIG. 16. As shown in FIG. 16, process blocks 1530/1540 may include receiving a request to record three or more programs simultaneously (block 1600), and simultaneously recording the three or more programs to one or more portions of the allocated storage based on the record request (block 1610). For example, in implementations described above in connection with FIG. 8, one or two TV programs 810 from television broadcasts may be simultaneously recorded by STB/DVR 120, and multiple (e.g., more than two) TV programs 820 from the television broadcasts may be simultaneously recorded by content server 140. STB/DVR 120 may receive one/two TV programs 810, and may store one/two TV programs 810 (e.g., locally within STB/DVR 120). Content server 140 may receive multiple programs 820, and may store multiple programs 820 (e.g., within the storage allocated to the user associated with STB/DVR 120). By enabling users of STB/DVR 120 to purchase storage space in content server 140, the users may be able to simultaneously record more than two programs (e.g., TV programs) in the purchased storage space. In one example, a user of STB/DVR 120 and/or user device 150 may request that one or more programs be simultaneously recorded to content server 140 even if the two tuners of STB/DVR 120 are available for use.

As further shown in FIG. 16, process blocks 1530/1540 may include receiving a request to upload one or more videos (block 1620), and uploading the one or more videos to one or more portions of the allocated storage based on the upload request (block 1630). For example, in one implementation, user device 150 may provide a request to upload one or more videos to content server 140. User device 150 may upload the one or more videos to one or more portions of the storage provided in content server 140 (e.g., within the storage allocated to the user associated with STB/DVR 120) based on the upload request. In one example, user device 150 (e.g., a computer connected to the Internet) may request that one or more videos (e.g., movies, music videos, etc. stored on the computer) be uploaded to content server 140. If content server 140 accepts the upload request, user device 150 may upload the one or more videos to one or more portions of the storage allocated in content server 140.

Figure 17:
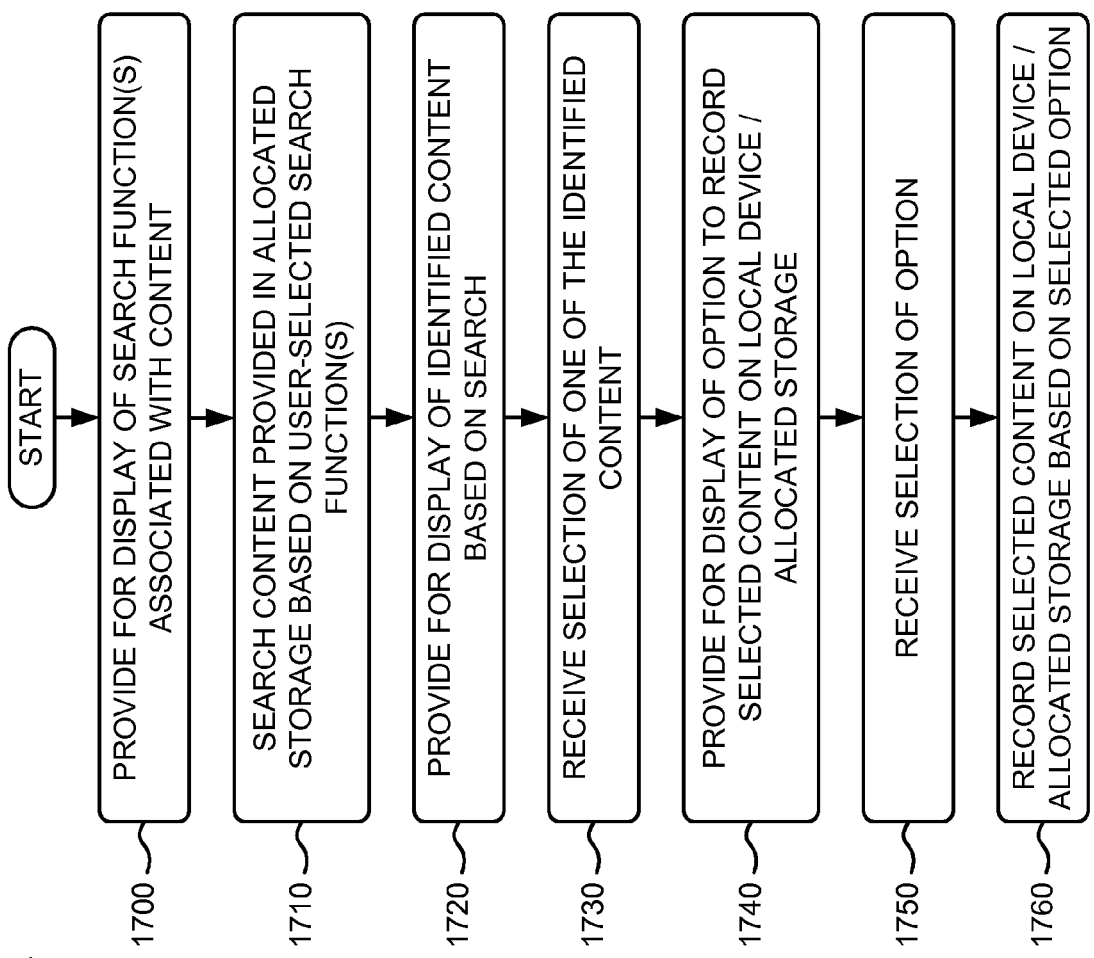

Alternatively and/or additionally, process blocks 1530/1540 may include the process blocks depicted in FIG. 17. As shown in FIG. 17, process blocks 1530/1540 may include providing for display of one or more search function(s) associated with content (block 1700), searching the content provided in the allocated storage based on one or more user-selected search functions (block 1710), and providing for display of the identified content based on the search (block 1720). For example, in implementations described above in connection with FIG. 13, search user interface 1300 may be generated by content server 140, and may include search entry 1320, browse categories option 1330, and category 1340. Search entry 1320, when selected, may provide information that enables a user of STB/DVR 120 and/or user device 150 to search for content stored on STB/DVR 120 and/or content server 140. If a user selects search entry 1320, one or more options (e.g., "Search with Keyboard," "Browse by Categories," etc.) for searching content provided on STB/DVR 120 and/or content server 140 may be displayed. If the user selects browse categories option 1330, one or more content categories (e.g., "Action," "Drama," "Movie," and "Information") may be displayed. If the user selects category 1340 (e.g., "Action"), one or more movies stored on STB/DVR 120 and/or content server 140 may be displayed.

As further shown in FIG. 17, process blocks 1530/1540 may include receiving selection of one of the identified content (block 1730), providing for display of an option to record the selected content on a local device or to the allocated storage (block 1740), receiving selection of an option (block 1750), and recording the selected content on the local device or to the allocated storage based on the selected option (block 1760). For example, in implementations described above in connection with FIG. 13, search user interface 1300 may be generated by content server 140, and may include movie 1350, viewable content window 1360, first selection mechanism 1370, and second selection mechanism 1380. If the user selects movie 1350 (e.g., "Movie 3"), content associated with movie 1350 may be displayed in viewable content window 1360. Viewable content window 1360 may include a window capable of displaying content associated with selected content (e.g., content associated with movie 1350). The user may record the content provided in viewable content window 1360 to content server 140 by selecting first selection mechanism 1370 (e.g., an icon, a button, a link, etc.). Alternatively and/or additionally, the user may record the content provided in viewable content window 1360 to STB/DVR 120 and/or user device 150 by selecting second selection mechanism 1380 (e.g., an icon, a button, a link, etc.).

Figure 18:
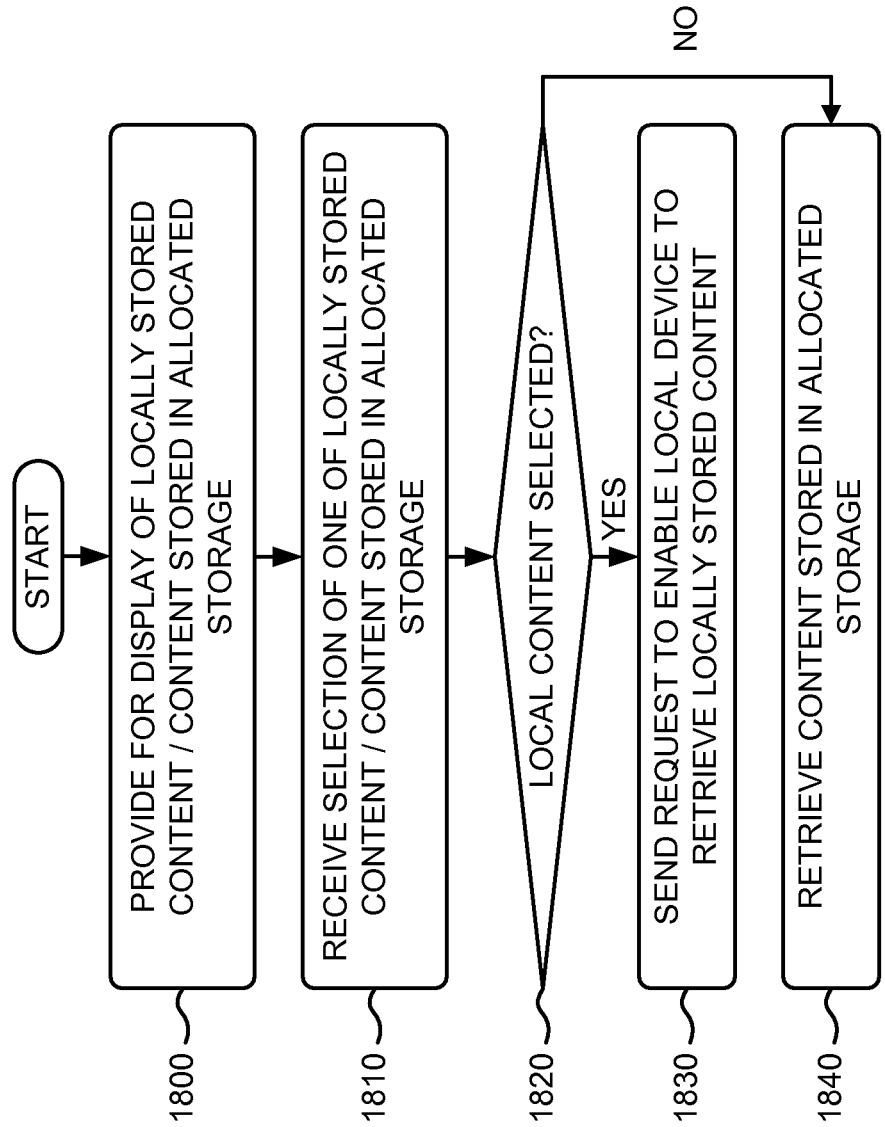

Process blocks 1550/1560 may include the process blocks depicted in FIG. 18. As shown in FIG. 18, process blocks 1550/1560 may include providing for display of locally stored content and content stored in the allocated storage (block 1800), and receiving selection of one of the locally stored content and the content stored in the allocated storage (block 1810). For example, in implementations described above in connection with FIG. 12, recorded programs user interface 1200 may be generated by content server 140 and may include recorded programs entry 1220, extended DVR folder 1230, extended DVR program 1240, episode 1250, and viewable content window 1260. Recorded programs entry 1220, when selected, may provide information associated with programs stored on STB/DVR 120 and/or content server 140. If a user selects recorded programs entry 1220, one or more names of programs (e.g., "Hollywood Squares 7/3," "Extended DVR," etc.) stored on STB/DVR 120 and/or content server 140 may be displayed. A user may select one of the names of programs stored on STB/DVR 120 and/or content server 140.

As further shown in FIG. 18, process blocks 1550/1560 may include determining whether the locally stored content is selected (block 1820). If the locally stored content is selected (block 1820—YES), a request may be sent to enable a local device to retrieve the locally stored content (block 1830). Otherwise (block 1820—NO), the content stored in the allocated storage may be retrieved (block 1840). For example, in implementations described above in connection with FIG. 12, if the user selects one of the names of the programs stored on STB/DVR 120 (e.g., "Hollywood Squares 7/3"), content server 140 may send a request to enable STB/DVR 120 to retrieve the selected program from STB/DVR 120. The retrieved, selected program may be displayed in viewable content window 1260. Alternatively, if the user selects extended DVR folder 1230, one or more names of extended DVR programs (e.g., "Heroes," "Lost," "Gilmore Girls," and "Star Trek") stored on content server 140 may be displayed. If the user selects extended DVR program 1240 (e.g., "Gilmore Girls"), one or more episodes stored on content server 140 may be displayed. If the user selects episode 1250 (e.g., "Gilmore Girls 3/26"), content associated with episode 1250 may be displayed in viewable content window 1260.

Systems and/or methods described herein may extend a STB/DVR into a network so that a user may copy, transfer, and/or archive content to a network storage device, and may increase a number of programs that may be recorded at a specific time. The systems and/or methods may enable a user to purchase various amounts of storage space in the network for recording or uploading content, and may provide the recorded/saved content to various devices for viewing. In one implementation, for example, the systems and/or methods may receive a request to allocate an amount of storage, and may allocate the amount of storage based on the request. The systems and/or methods may receive a request to record and/or upload content, and may record and/or upload the content to one or more portions of the allocated storage based on the record/upload request. The systems and/or methods may receive a request to view content from one or more STBs and/or one or more user devices, may retrieve the requested content from one or more portions of the allocated storage, and may provide the retrieved content to the STB(s) and/or user device(s).

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 15-18, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method comprising:
   receiving, by a set-top box, a first request to record two or more programs simultaneously,
   the set-top box being associated with a first user;
   providing, for display in a first screenshot, a first section that includes first information regarding a first status associated with the set-top box and second information,
   the first information including:
   a first amount of recording time associated with a first type of video content,
   a second amount of recording time associated with a second type of video content, the first type of video content being different than the second type of video content, and
   the second information including:
   information associated with storage available at a remote server,
   the information including a prompt associated with purchasing an amount of storage at the remote server;
   transmitting, by the set-top box, a request, to the remote server, to purchase the amount of storage, the remote server being associated with the first user and a plurality of second users and the amount of storage being associated with the first user;

receiving, by the set-top box and from the remote server, an indication that the requested amount of storage is purchased and available;

providing, for display in a second screenshot, a second section that includes third information regarding a second status associated with the remote server and the first information, the third information including:

a third amount of recording time associated with the first type of video content, and a fourth amount of recording time associated with the second type of video content;

recording, by the set-top box, at least one program of the two or more programs; and transmitting, by the set-top box and to the remote server and without regard to a capability regarding a number of programs, of the two or more programs, that the set-top box can record, one or more instructions to record at least one other program, of the two or more programs, at a same time that the set-top box records the at least one program, the at least one other program being stored in the purchased amount of storage.

2. The method of claim 1, further comprising:
transmitting, by the set-top box and to the remote server, a request to upload content.

3. The method of claim 2, where the content includes one or more videos.

4. The method of claim 1, further comprising:
transmitting, by the set-top box, a request to view the at least one other program;
receiving, by the set-top box and from the remote server, the at least one other program; and
providing, by the set-top box and for display, the at least one other program.

5. The method of claim 1, where the first request is a request to record three or more programs simultaneously, the method further comprising:
recording, by the set-top box, two programs of the three or more programs.

6. The method of claim 1, further comprising:
transmitting, by the set-top box and to the remote server, a second request to search for the at least one other program; and
receiving, by the set-top box and from the remote server, the at least one other program based on the second request.

7. The method of claim 1, further comprising:
providing for display, by the set-top box, a first option to record the at least one program on the set-top box;
providing for display, by the set-top box, a second option to record the at least one other program at the remote server;
receiving, by the set-top box, selection of at least one of the first option or the second option;
recording, by the set-top box, the at least one program when the first option is selected; and
transmitting, by the set-top box and to the server, the one or more instructions to record the at least one other program when the second option is selected.

8. The method of claim 1, further comprising:
providing, for display, by the set-top box, information regarding the at least one program recorded by the set-top box and information regarding the at least one other program recorded by the server;

receiving, by the set-top box, selection of at least one of the information regarding the at least one program recorded by the set-top box or the information regarding the at least one other program recorded by the server;

retrieving, by the set-top box and based on a selection of the information regarding the at least one program recorded by the set-top box, the at least one program; and receiving, by the set-top box and based on a selection of the information regarding the at least one other program recorded by the server, the at least one other program.

9. A method comprising:
receiving, by a set-top box, a first request to record three or more programs simultaneously,
the set-top box being associated with a first user;
transmitting, by the set-top box, a request, to a remote server, to purchase an amount of storage,
the remote server being associated with the first user and a plurality of second users and the amount of storage being associated with the first user;
receiving, by the set-top box and from the remote server, an indication that the requested amount of storage is purchased and available;
providing, for display in a first screenshot, a first section that includes first information regarding a first status associated with the set-top box and second information,
the first information including:
a first amount of available recording time associated with a first type of video content, and
a second amount of available recording time associated with a second type of video content, the first type of video content being different than the second type of video content, and
the second information including:
information associated with storage available at the remote server,
the information including a prompt associated with purchasing an amount of storage at the remote server;
providing, for display in a second screenshot, a second section that includes third information regarding a second status associated with the remote server and the first information, the third information including:
a third amount of available recording time associated with the first type of video content, and
a fourth amount of available recording time associated with the second type of video content;
recording, by the set-top box, two programs of the three or more programs; and
transmitting, by the set-top box and to the remote server and without regard to a capability regarding a number of programs, of the two or more programs, that the set-top box can record, one or more instructions to record at least one other program, of the three or more programs that is not recorded by the set-top box,
the at least one other program being stored in the purchased amount of storage.

10. The method of claim 9, further comprising:
transmitting, by the set-top box and to the server, a request to upload content, where the content includes one or more videos.

11. The method of claim 9, further comprising:
transmitting, by the set-top box and to the server, a second request to search the at least one other program recorded in the allocated amount of storage; and
receiving, by the set-top box and from the server, the at least one other program based on the second request.

12. The method of claim 9, further comprising:
providing for display, by the set-top box, a first option to record the at least one program on the set-top box;
providing for display, by the set-top box, a second option to record the at least one other program at the server;
receiving, by the set-top box, selection of at least one of the first option or the second option;
recording, by the set-top box, the at least one program when the first option is selected; and
transmitting, by the set-top box and to the server, the one or more instructions to record at least one other program when the second option is selected.

13. A device comprising:
a set-top box, associated with a first user, to:
receive a first request to record two or more programs simultaneously;
provide, for display in a first screenshot, a first section that includes first information regarding a first status associated with the set-top box and second information,
the first information including:
a first amount of recording time associated with a first type of video content, and
a second amount of recording time associated with a second type of video content, the first type of video content being different than the second type of video content, and
the second information including:
information associated with storage available at a remote server,
the information including a prompt associated with purchasing an amount of storage at the remote server;
transmit a request, to the remote server, to purchase the amount of storage, the remote server being associated with the first user and a plurality of second users and the amount of storage being associated with the first user;
receive, from the remote server, an indication that the requested amount of storage is purchased and available;
provide, for display in a second screenshot, a second section that includes third information regarding a second status associated with the remote server and the first information, the third information including:
a third amount of recording time associated with the first type of video content, and
a fourth amount of recording time associated with the second type of video content;
record at least one program of the two or more programs; and
transmit, to the remote server and without regard to a capability regarding a number of programs, of the two or more programs, that the set-top box can record, one or more instructions to record at least one other program, of the two or more programs, at a same time that the set-top box records the at least one program, the at least one other program being stored in the purchased amount of storage.

14. The device of claim 13, where the set-top box is further to:
transmit, to the server, a request to upload content, where the content includes one or more videos.

15. The device of claim 13, where the set-top box is further to:
receive a second request to upload content, and
transmit, to the remote server, a third request to store the content in one or more portions of an allocated amount of storage.

16. The device of claim 15, where the content includes one or more videos.

17. The device of claim 13, where the set-top box is further to:
transmit a request to view the at least one other program;
receive, from the server, the at least one other program; and
provide, for display, the at least one other program.

18. The device of claim 13, where the first request is a request to record three or more programs simultaneously, and the set-top box is further to:
record two programs of the three or more programs.

19. The device of claim 13, where the set-top box is further to:
transmit, to the server, a second request to search for the at least one other program; and
receive, from the server, the at least one other program based on the second request.

20. The device of claim 13, where the set-top box is further to:
provide, for display, a first option to record the at least one program on the set-top box;
provide a second option to record the at least one other program at the server;
receive selection of at least one of the first option or the second option;
record the at least one program when the first option is selected; and
transmit, to the server, the one or more instructions to record the at least one other program when the second option is selected.

21. The device of claim 13, where the set-top box is further to:
provide, for display, information regarding the at least one program recorded by the set-top box and information regarding the at least one other program recorded by the remote server;
receive selection of at least one of the information regarding the at least one program recorded by the set-top box or the information regarding the at least one other program recorded by the server;
retrieve, based on a selection of the information regarding the at least one program recorded by the set-top box, the at least one program; and
receive, based on a selection of the information regarding the at least one other program recorded by the server, the at least one other program.

22. A non-transitory computer-readable medium storing instructions, the instructions comprising:
one or more instructions which, when executed by at least one processor, cause the at least one processor to receive a first request, from a first user, to record two or more programs simultaneously;
one or more instructions which, when executed by at least one processor, cause the at least one processor to transmit a request, to a remote server, to purchase an amount of storage, the remote server being associated with the first user and a plurality of second users and the amount of storage being associated with the first user;
one or more instructions which, when executed by at least one processor, cause the at least one processor to receive, from the remote server, an indication that the requested amount of storage is purchased and available;

one or more instructions which, when executed by at least one processor, cause the at least one processor to provide, for display in a first screenshot, a first section that includes first information regarding a first status associated with the set-top box and second information, the first information including:

a first amount of available recording time associated with a first type of video content, and a second amount of available recording time associated with a second type of video content, the first type of video content being different than the second type of video content, and the second information including:

information associated with storage available at the remote server, the information including a prompt associated with purchasing an amount of storage at the remote server;

one or more instructions which, when executed by at least one processor, cause the at least one processor to provide, for display in a second screenshot, a second section that includes third information regarding a second status associated with the remote server and the first information, the third information including:

a third amount of available recording time associated with the first type of video content, and a fourth amount of available recording time associated with the second type of video content;

one or more instructions which, when executed by the at least one processor, cause the at least one processor to record at least one program of the two or more programs; and one or more instructions which, when executed by the at least one processor, cause the at least one processor to transmit, to the remote server and without regard to a capability regarding a number of programs, of the two or more programs, that the set-top box can record, one or more instructions to record at least one other program, of the two or more programs, at a same time that the set-top box records the at least one program, the at least one other program being stored in the purchased amount of storage.

23. The medium of claim 22, where the first request is a request to record three or more programs simultaneously, the medium further comprising:

one or more instructions which, when executed by the at least one processor, cause the at least one processor to record two programs of the three or more programs.

24. The medium of claim 22, further comprising:

one or more instructions which, when executed by the at least one processor, cause the at least one processor to transmit, to the server, a second request to search for the at least one other program; and one or more instructions which, when executed by the at least one processor, cause the at least one processor to receive, from the server, the at least one other program based on the second request.

25. The medium of claim 22, further comprising:

one or more instructions which, when executed by the at least one processor, cause the at least one processor to provide, for display, a first option to record the at least one program on the set-top box;

one or more instructions which, when executed by the at least one processor, cause the at least one processor to provide, for display, a second option to record the at least one other program at the server;

receiving, by the set-top box, selection of at least one of the first option or the second option;

one or more instructions which, when executed by the at least one processor, cause the at least one processor to record the at least one program when the first option is selected; and one or more instructions which, when executed by the at least one processor, cause the at least one processor to transmit, to the server, the one or more instructions to record the at least one other program when the second option is selected.

* * * * *